United States Patent
Oda et al.

(10) Patent No.: US 11,084,733 B2
(45) Date of Patent: Aug. 10, 2021

(54) METHOD FOR PRODUCING INORGANIC OXIDE IN FORM OF THIN FILM

(71) Applicant: KAO CORPORATION, Tokyo (JP)

(72) Inventors: Tsuyoshi Oda, Wakayama (JP); Ryo Onishi, Wakayama (JP)

(73) Assignee: KAO CORPORATION, Tokyo (JP)

(*) Notice: Subject to any disclaimer, the term of this patent is extended or adjusted under 35 U.S.C. 154(b) by 139 days.

(21) Appl. No.: 16/324,466

(22) PCT Filed: Aug. 8, 2017

(86) PCT No.: PCT/JP2017/028817
§ 371 (c)(1),
(2) Date: Feb. 8, 2019

(87) PCT Pub. No.: WO2018/030425
PCT Pub. Date: Feb. 15, 2018

(65) Prior Publication Data
US 2019/0169040 A1    Jun. 6, 2019

(30) Foreign Application Priority Data

Aug. 9, 2016 (JP) .............................. JP2016-156263
Mar. 14, 2017 (JP) .............................. JP2017-048589

(51) Int. Cl.
*C01G 23/04* (2006.01)
*C09D 11/00* (2014.01)
(Continued)

(52) U.S. Cl.
CPC .............. *C01G 23/04* (2013.01); *C01B 13/36* (2013.01); *C01G 25/02* (2013.01); *C09D 11/00* (2013.01)

(58) Field of Classification Search
CPC ........ C01G 23/04; C01G 25/02; B01B 13/36; C09D 11/00
See application file for complete search history.

(56) References Cited

U.S. PATENT DOCUMENTS

| 9,127,331 B2 | 9/2015 | Kuraki et al. |
| 2006/0269695 A1 | 11/2006 | Daly et al. |
| (Continued) |

FOREIGN PATENT DOCUMENTS

| CN | 101177299 A | 5/2008 |
| CN | 102674454 A | 5/2008 |
| (Continued) |

OTHER PUBLICATIONS

Miao et al., "Synthesis of mesoporous TiO2 films in ionic liquid dissolving cellulose," Microporous and Mesoporous Materials, vol. 95, Nos. 1-3, Jun. 19, 2006, 2 pages, abstract provided only.
(Continued)

*Primary Examiner* — James A Fiorito
(74) *Attorney, Agent, or Firm* — Birch, Stewart, Kolasch & Birch, LLP

(57) ABSTRACT

Provided is a method for producing an inorganic oxide in the form of a thin film, the method including a step of bringing a first liquid and a second liquid with each other, the first liquid containing an inorganic oxide precursor and the second liquid containing a substance reacting with the inorganic oxide precursor of the first liquid to form an inorganic oxide derived from the inorganic oxide precursor. The step is performed by continuous operation. At least one of the first liquid and the second liquid includes an ionic liquid.

25 Claims, 13 Drawing Sheets

(51) Int. Cl.
*C01B 13/36* (2006.01)
*C01G 25/02* (2006.01)

(56) References Cited

U.S. PATENT DOCUMENTS

| | | |
|---|---|---|
| 2007/0292686 A1 | 12/2007 | Nagasawa et al. |
| 2009/0047518 A1 | 2/2009 | Sawada et al. |
| 2009/0134356 A1 | 5/2009 | Ochiai et al. |
| 2010/0215988 A1 | 8/2010 | Daly et al. |
| 2011/0089018 A1* | 4/2011 | Chang ............... C01G 23/047 204/157.43 |
| 2012/0007020 A1 | 1/2012 | Tarascon et al. |
| 2012/0108745 A1 | 5/2012 | Yamamoto |
| 2012/0275991 A1 | 11/2012 | de Oliveira et al. |
| 2014/0309416 A1 | 10/2014 | Teixeira et al. |
| 2016/0002358 A1 | 1/2016 | Teixeira et al. |
| 2018/0030554 A1 | 2/2018 | Teixeira et al. |

FOREIGN PATENT DOCUMENTS

| | | |
|---|---|---|
| CN | 101293669 A | 10/2008 |
| CN | 101505879 A | 8/2009 |
| CN | 101580275 A | 11/2009 |
| CN | 102616839 A | 8/2012 |
| JP | 2001-261434 A | 9/2001 |
| JP | 2004-35303 A | 2/2004 |
| JP | 2004-224623 A | 8/2004 |
| JP | 2005-263551 A | 9/2005 |
| JP | 2008-202076 A | 9/2008 |
| JP | 4464171 B2 | 5/2010 |
| JP | 2012-506360 A | 3/2012 |
| JP | 2012-111684 A | 6/2012 |
| JP | 2012-193047 A | 10/2012 |
| JP | 2013-515603 A | 5/2013 |
| JP | 2014-84246 A | 5/2014 |
| KR | 10-2015-00027385 A | 3/2015 |
| WO | WO 2007/105524 A1 | 9/2007 |
| WO | WO 2012/147209 A1 | 11/2012 |
| WO | WO 2014/138100 A1 | 9/2014 |
| WO | WO 2016/027858 A1 | 2/2016 |

OTHER PUBLICATIONS

International Preliminary Report on Patentability and English translation of the Written Opinion of the International Searching Authority for International Application No. PCT/JP2017/028817, dated Feb. 21, 2019.

International Preliminary Report on Patentability and English translation of the Written Opinion of the International Searching Authority for International Application No. PCT/JP2017/028818, dated Feb. 21, 2019.

International Search Report (PCT/ISA/210) issued in PCT/JP2017/028818, dated Oct. 3, 2017.

International Search Report for PCT/JP2017/028817 (PCT/ISA/210) dated Oct. 3, 2017.

Chu et al., "Progress of construction of micro-scale phase interfaces and preparation of novel functional materials with microfluids," Chemical Industry and Engineering Progress, vol. 33, No. 9, 2014, pp. 2229-2234, with English abstract.

Lan et al., "Controllable synthesis of microscale titania fibers and tubes using co-laminar micro-flows," Chemical Engineering Journal, vol. 181-182, 2012, pp. 828-833.

Li et al., "Ionic liquid-assisted Growth of Flower-like $TiO_2$ Film on Ti Substrate with High Photocatalytic Activity," Journal of Molecular Catalysis A: Chemical, vol. 373, 2013 (Available online Mar. 14, 2013), pp. 12-17 (total 7 pages).

Miao et al., "Synthesis of Mesoporous $TiO_2$ Films in Ionic Liquid Dissolving Cellulose," Microporous and Mesoporous Materials, vol. 95, Nos. 1-3. Oct. 18, 2006 (Available online Jun. 19, 2006), pp. 26-30, (total 7 pages).

Nakashima et al., "Interfacial Synthesis of Hollow $TiO_2$ Microspheres in Ionic Liquids," Journal of the American Chemical Society, vol. 125, No. 21, 2003 (Publication date May 6, 2003), pp. 6386-6387 (total 6 pages).

Yan et al., "Structural Characterization of Nanocrystalline $TiO_2$ from Ionic Liquid-Water Solvent Mixture and its Photocatalytic Activity," Acta Phys. -Chim. Sin., vol. 23, No. 7, Jul. 2007 (Published on Web: May 22, 2007), pp. 1032-1036 (total 29 pages), with machine translation.

* cited by examiner

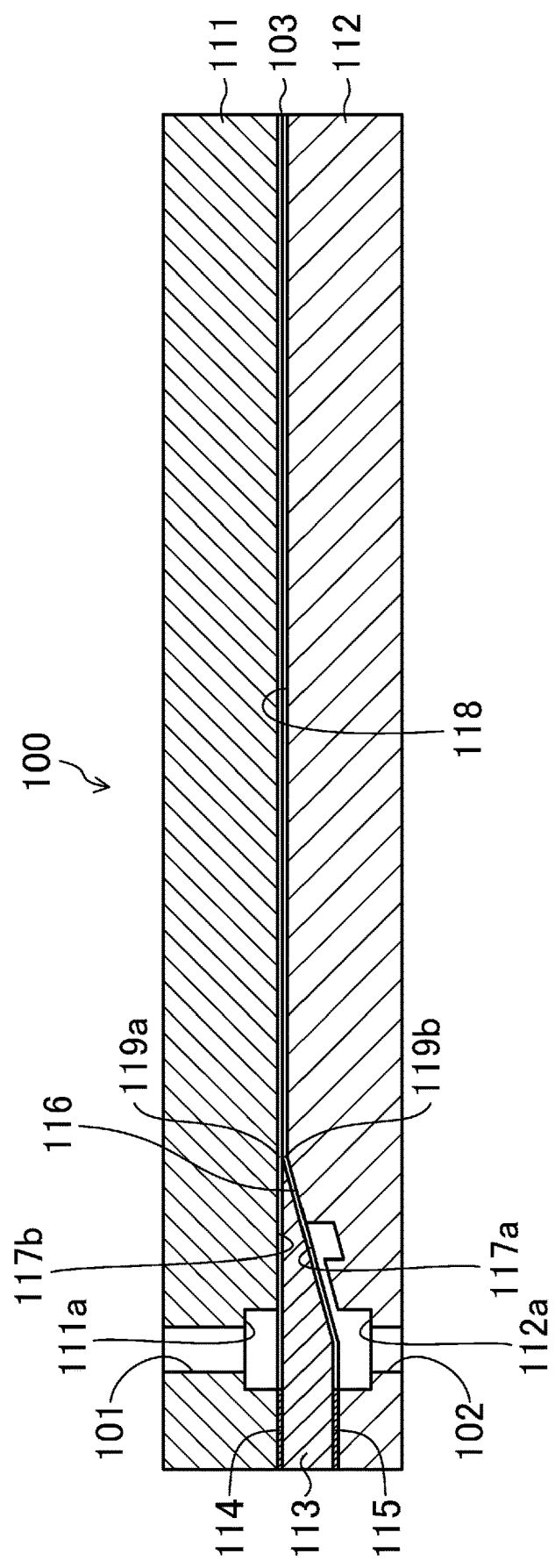

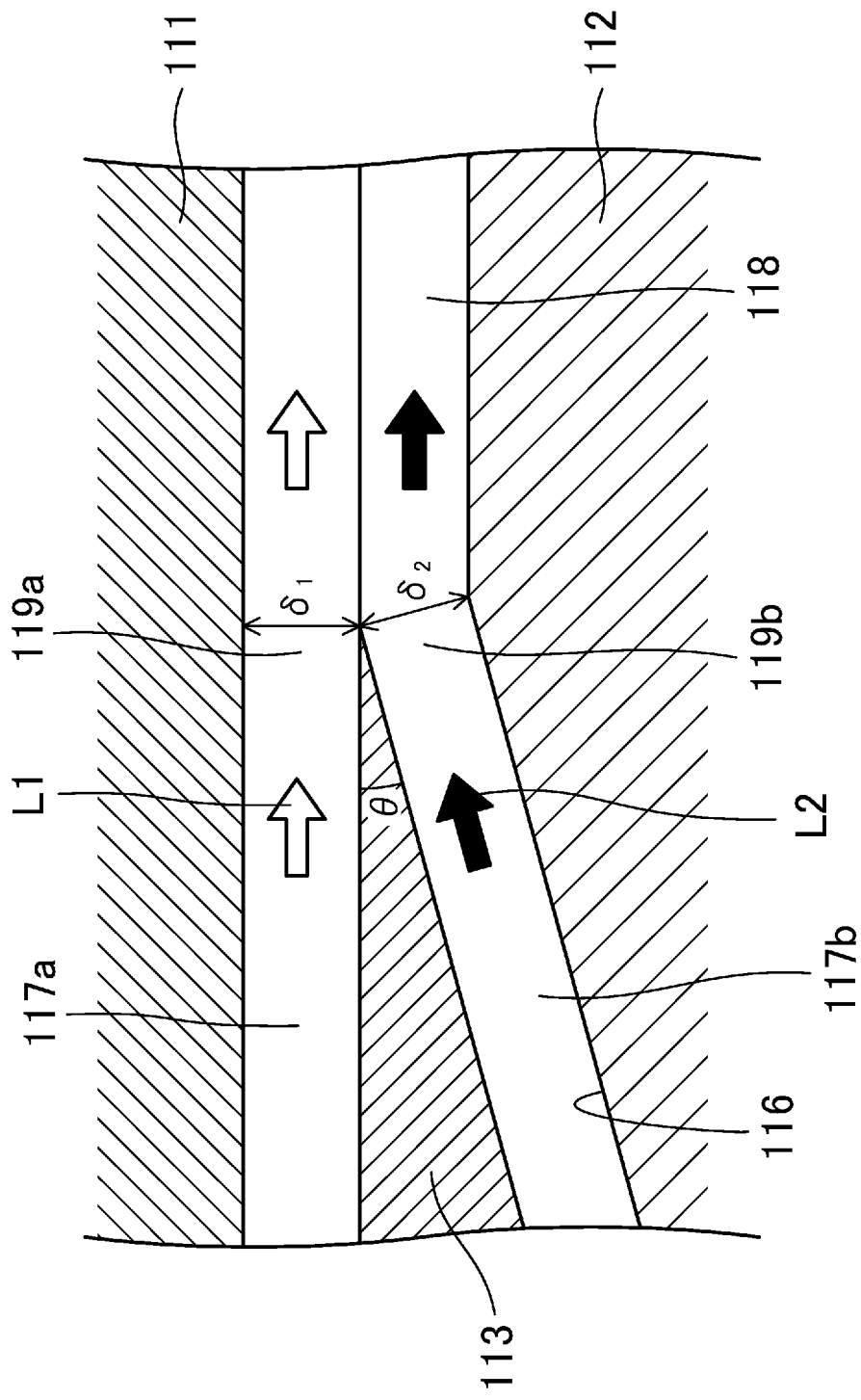

[Table 5]

| Example 4-1 | Example 4-2 | Example 4-3 |
|---|---|---|
|  |  |  |

[Table 7]

| Example 5 |
|---|
|  |

METHOD FOR PRODUCING INORGANIC OXIDE IN FORM OF THIN FILM

TECHNICAL FIELD

The present invention relates to a method for producing an inorganic oxide in the form of a thin film.

BACKGROUND ART

Inorganic oxides, such as titanium oxide, silica, and alumina, have been widely used as, for example, materials of paints, ink, and coating materials, ultraviolet ray protective agents, and pearl pigments. As a method for producing such an inorganic oxide, Patent Document 1 discloses a method in which, to an ionic liquid containing a small amount of water, a solution obtained by dissolving a metal alkoxide into an organic solvent that phase-separates from the ionic liquid is added and stirred, whereby the metal alkoxide is hydrolyzed and polycondensed to produce hollow particles of an inorganic oxide. Patent Document 2 discloses a method in which a precursor liquid obtained by stabilizing a titanium alkoxide with a stabilizing agent is mixed with a mixed solution of a water-containing reactive solvent and an ionic liquid, and the resultant mixture is heated while being stirred, whereby a dispersion containing titanium oxide particles obtained by hydrolyzing a titanium alkoxide is prepared, and using the dispersion, a titanium oxide in the form of a thin film is produced.

CITATION LIST

Patent Document

PATENT DOCUMENT 1: Japanese Unexamined Patent Publication No. 2004-35303
PATENT DOCUMENT 2: Japanese Unexamined Patent Publication No. 2014-84246

SUMMARY OF THE INVENTION

The present invention provides a method for producing an inorganic oxide in the form of a thin film, the method comprising a step of bringing a first liquid and a second liquid into contact with each other, the first liquid containing an inorganic oxide precursor and the second liquid containing a substance reacting with the inorganic oxide precursor of the first liquid to form an inorganic oxide derived from the inorganic oxide precursor, wherein the step is performed by continuous operation, and at least one of the first liquid and the second liquid includes an ionic liquid.

BRIEF DESCRIPTION OF THE DRAWINGS

FIG. 11C is a cross-sectional view taken along a line XIC-XIC in FIG. 11A.

FIG. 11E is an enlarged longitudinal cross-sectional view of a portion including a first slit and a second slit.

FIG. 12B is a cross-sectional view taken along a line XIIB-XIIB in

FIG. 12A.

DESCRIPTION OF EMBODIMENTS

Figure 1:
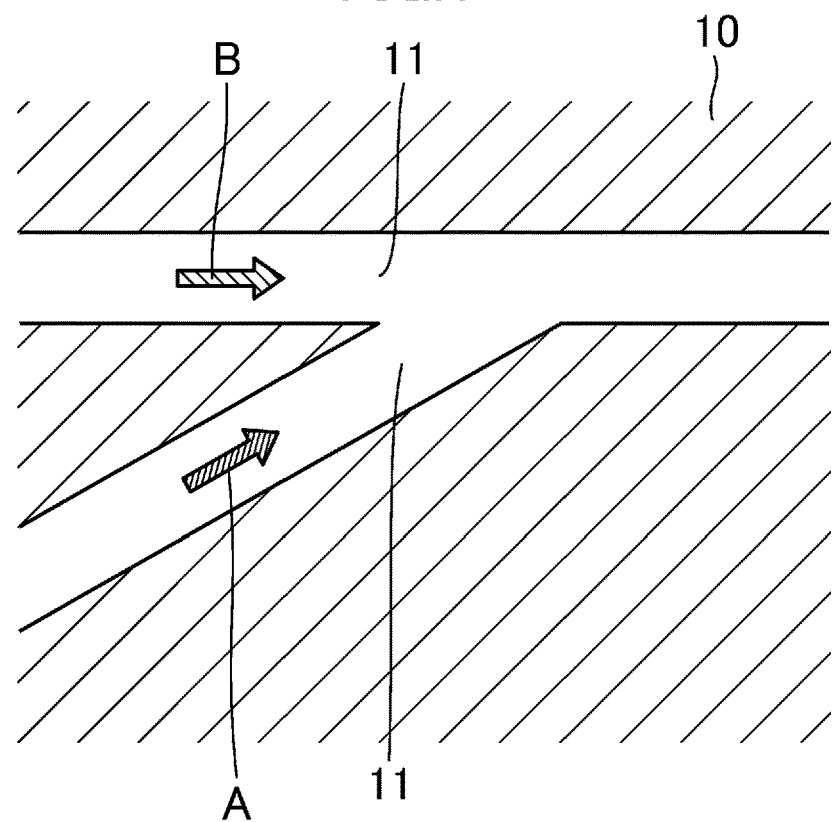
FIG. 1 is a diagram illustrating a first specific manner in which, in a mode of allowing at least one of the first liquid and the second liquid to flow and supplying and allowing the flowing one to have contact with the other, the one is supplied with the other.

Hereinafter, an embodiment will be described in detail.

A method for producing an inorganic oxide in the form of a thin film according to the embodiment includes an inorganic-oxide-formation step at which an inorganic oxide in the form of a thin film is formed by a step of bringing a first liquid and second liquid into contact with each other, the first liquid containing an inorganic oxide precursor and the second liquid containing a substance (hereinafter, referred to as an inorganic-oxide-forming substance) reacting with the inorganic oxide precursor of the first liquid to form an inorganic oxide gel derived from the inorganic oxide precursor. The inorganic-oxide-formation step is performed by continuous operation to obtain a slurry containing the inorganic oxide gel in the form of the thin film as a reaction product. At this time, at least one of the first liquid and the second liquid includes an ionic liquid. The term "ionic liquid" used in the present application refers to a salt in the form of a liquid at a temperature of 100° C. or lower under atmospheric pressures. The term "continuous operation" used in the present application refers to an operation in which, at the inorganic-oxide-formation step performed by the step of bringing the first liquid and the second liquid into contact with each other, the first liquid and the second liquid are continuously or intermittently brought into continual contact with each other while the inorganic oxide in the form of the thin film as a reaction product is continually collected. Therefore, the "continuous operation" used in the present application is different from a batch operation.

Note that, according to the method, disclosed in Patent Document 1, for producing an inorganic oxide, hollow particles of the inorganic oxide are obtained. According to the method, disclosed in Patent Document 2, for producing a titanium oxide in the form of a thin film, a dispersion containing titanium oxide particles is prepared first, and, using the dispersion, a titanium oxide in the form of a thin film is indirectly produced. Both of the methods disclosed in Patent Documents 1 and 2 are methods for producing an inorganic oxide by batch operation.

In contrast, the method for producing an inorganic oxide in the form of a thin film according to the embodiment allows an inorganic oxide in the form of a thin film to be directly and continuously produced by bringing a first liquid and a second liquid into contact with each other by continuous operation, the first liquid containing an inorganic oxide precursor and a second liquid containing an inorganic-oxide-forming substance that reacts with the inorganic oxide precursor to form an inorganic oxide gel derived from the inorganic oxide precursor, in which at least one of the first and second liquids includes an ionic liquid. This is presumably because, when the first and second liquids, at least one of which includes an ionic liquid, are brought into contact with each other, in contact interfaces between the first and second liquids that are successively formed by the continuous operation, a reaction rate at which the inorganic oxide precursor reacts with the inorganic-oxide-forming substance to form an inorganic oxide gel is suitable for two-dimensional growth of the gel. Furthermore, the method for producing an inorganic oxide in the form of a thin film according to the embodiment enables the production of an inorganic oxide in the form of a thin film with excellent uniformity in the thicknesses of thin films.

The first liquid contains an inorganic oxide precursor. The first liquid may be a solution in which the inorganic oxide precursor is dissolved in a solvent, or may be a dispersion in which the inorganic oxide precursor is dispersed in a dispersion medium. The first liquid suitably contains, for example, hydrocarbons, such as toluene, hexane, heptane, and benzene, and chloroform. The first liquid suitably contains one or two or more of the above-mentioned substances. From the viewpoint of directly and continuously producing an inorganic oxide in the form of a thin film, the first liquid more suitably contains one or two or more of toluene, hexane, and heptane.

Examples of the inorganic oxide precursor include inorganic substances each having a hydrolyzable functional group from which an inorganic oxide, such as titanium oxide, zirconium oxide, yttrium oxide, silica, or alumina, is derived by sol-gel transition accompanied by a hydrolysis reaction and a polycondensation reaction. Examples of the inorganic oxide precursor include alkoxides, halides, salts and coordination compounds (complexes) each having a hydrolyzable functional group, such as a carboxyl group or β-diketone, and amines of the above-mentioned inorganic oxides. As the inorganic oxide precursor, one or two or more of the above-mentioned inorganic oxide precursors are suitably used. From the viewpoint of directly and continuously producing the inorganic oxide in the form of the thin film, the inorganic oxide precursor is more suitably an alkoxide, still more suitably a metal alkoxide, still further more suitably a titanium alkoxide and a zirconium alkoxide each having high reactivity, still further more suitably a titanium alkoxide and a zirconium alkoxide each having an alkyl group having 2 to 4, inclusive, carbon atoms.

Examples of the titanium alkoxide include tetraethyl orthotitanate, tetraisopropyl orthotitanate, and tetra-n-butyl orthotitanate (hereinafter, referred to as "Ti(OBu)$_4$"). Examples of the zirconium alkoxide include tetraethyl orthozirconate, tetraisopropyl orthozirconate, and tetra-n-butyl orthozirconate (hereinafter, referred to as "Zr(OBu)$_4$").

From the viewpoint of directly and continuously producing the inorganic oxide in the form of the thin film, the inorganic oxide precursor content $c_1$ of the first liquid is suitably 1% by mass or more, more suitably 5% by mass or more, still more suitably 8% by mass or more, and from the same viewpoint, suitably 80% by mass or less, more suitably 70% by mass or less, still more suitably 60% by mass or less, still further more suitably 50% by mass or less, still further more suitably 40% by mass or less. The inorganic oxide precursor content $c_1$ of the first liquid is suitably 1% by mass or more and 80% by mass or less, more suitably 5% by mass or more and 70% by mass or less, still more suitably 8% by mass or more and 60% by mass or less, still further more suitably 8% by mass or more and 50% by mass or less, still further more suitably 8% by mass or more and 40% by mass or less.

The second liquid contains an inorganic-oxide-forming substance. The second liquid may be a solution in which the inorganic-oxide-forming substance is dissolved, or may be a dispersion in which the inorganic-oxide-forming substance is dispersed.

In the case where the inorganic oxide precursor is an inorganic substance having a hydrolyzable functional group from which an inorganic oxide, such as a metal alkoxide, is derived, typical examples of the inorganic-oxide-forming substance include water. Only one inorganic-oxide-forming substance may be used, or two or more inorganic-oxide-forming substances may be used.

From the viewpoint of directly and continuously producing the inorganic oxide in the form of the thin film, the inorganic-oxide-forming substance content $c_2$ of the second liquid is suitably 0.1% by mass or more, more suitably 0.5% by mass or more, still more suitably 0.8% by mass or more, still further more suitably 1% by mass or more, still further more suitably 5% by mass or more. Furthermore, from the viewpoint of forming a thin film with high selectivity while directly and continuously producing the inorganic oxide in the form of the thin film, the inorganic-oxide-forming substance content $c_2$ is suitably 70% by mass or less, more suitably 30% by mass or less, still more suitably 20% by mass or less, still further more suitably 15% by mass or less, still further more suitably 12% by mass or less. The inorganic-oxide-forming substance content $c_2$ of the second liquid is suitably 0.1% by mass or more and 70% by mass or less, more suitably 0.5% by mass or more and 30% by mass or less, still more suitably 0.8% by mass or more and 20% by mass or less, still further more suitably 1% by mass or more and 15% by mass or less, still further more suitably 5% by mass or more and 12% by mass or less.

As for the relation between the first and second liquids, the inorganic oxide precursor content $c_1$ of the first liquid may be equal to the inorganic-oxide-forming substance content $c_2$ of the second liquid, may be higher than the inorganic-oxide-forming substance content $c_2$ of the second liquid, or may be lower than the inorganic-oxide-forming substance content $c_2$ of the second liquid.

At least one of the first and second liquids includes an ionic liquid. Hence, it may be configured such that both of the first liquid containing the inorganic oxide precursor and the second liquid containing the inorganic-oxide-forming substance include an ionic liquid. Alternatively, it may be configured such that the first liquid does not include any ionic liquid and the second liquid includes an ionic liquid. Alternatively, it may be configured such that the first liquid includes an ionic liquid and the second liquid does not contain any ionic liquid.

Examples of cations of the ionic liquid include ammonium cations and phosphonium cations.

Examples of the ammonium cations include 1-alkyl-3-alkylimidazolium cations of the following Formula (1). Note that $R^1$ and $R^2$ are suitably not identical to each other.

[Formula 1-1]

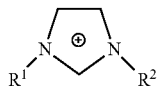

(1)

(where $R^1$ is an alkyl group having 12 or less carbon atoms, or a functional group in which one or two or more oxygen atoms are introduced between carbon atomic bonds of an alkyl group so as to form an ether linkage and the total of the number of the carbon atoms and the number of the oxygen atoms is 12 or less; and $R^2$ is an alkyl group having 1 to 4, inclusive, carbon atoms, or a hydrogen atom.)

The 1-alkyl-3-alkylimidazolium cations of the above-mentioned Formula (1) are suitably 1-alkyl-3-methylimidazolium cations, more suitably 1-methyl-3-methylimidazolium cations, 1-ethyl-3-methylimidazolium cations (hereinafter, referred to as "Emim"), 1-propyl-3-methylimidazolium cations, and 1-butyl-3-methylimidazolium cations (hereinafter, referred to as "Bmim").

Examples of the ammonium cations include N-alkylpyridium cations of the following Formula (2).

[Formula 2-1]

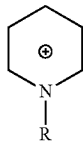

(2)

(where R is an alkyl group having 12 or less carbon atoms, or a functional group in which one or two or more oxygen atoms are introduced between carbon atomic bonds of an alkyl group so as to form an ether linkage, and the total of the number of the carbon atoms and the number of the oxygen atoms is 12 or less.)

The N-alkylpyridium cations of the above-mentioned Formula (2) are suitably 1-methylpyridium cations, 1-ethylpyridium cations, 1-propylpyridium cations, and 1-butylpyridium cations.

Examples of the ammonium cations include cations of the following Formula (3).

$$[NR_xH_{4-x}]^+ \qquad (3)$$

(where R is an alkyl group having 12 or less carbon atoms, or a functional group in which one or two or more oxygen atoms are introduced between carbon atomic bonds of an alkyl group so as to form an ether linkage, and the total of the number of the carbon atoms and the number of the oxygen atoms is 12 or less; and X is an integer of 0 to 4 inclusive.)

The ammonium cations of the above-mentioned Formula (3) are suitably N,N,N-triethyl-N-propylammonium cations, tetramethylammonium cations, tetraethylammonium cations, and ethyldimethylpropylammonium cations.

Examples of the phosphonium cations include cations of the following Formula (4).

$$[PR_xH_{4-x}]^+ \qquad (4)$$

(where R is an alkyl group having 12 or less carbon atoms, or a functional group in which one or two or more oxygen atoms are introduced between carbon atomic bonds of an alkyl group so as to form an ether linkage, and the total of the number of the carbon atoms and the number of the oxygen atoms is 12 or less; and X is an integer of 0 to 4 inclusive).

The phosphonium cations of the above-mentioned Formula (4) are suitably tetramethylphosphonium cations, tetraethylphosphonium cations, and tributylmethylphosphonium cations.

Examples of anions of the ionic liquid include bis(trifluoromethylsulfonyl)amide anions ($[(CF_3SO_2)_2N]^-$) (hereinafter, also referred to as "NTf2"), ethyl sulfate anions ($[C_2H_5OSO_3]^-$) (hereinafter, also referred to as "ES"), bis(fluorosulfonyl)amide anions ($[(FSO_2)_2N]^-$), dicyanamide anions ($[(CN)_2N]^-$) (hereinafter, also referred to as "DCA"), tetrafluoroborate anions ($BF_4^-$), hexafluorophosphate anions ($PF_6^-$), halide anions ($Cl^-$, $Br^-$, $I^-$), and trifluoromethanesulfonate anions ($[CF_3SO_3]^-$).

As the ionic liquid, one or two or more of combinations of these cations and anions are suitably used.

From the viewpoint of directly and continuously producing the inorganic oxide in the form of the thin film, suitably, the first liquid is a solution in which any ionic liquid is not contained and the inorganic oxide precursor is dissolved in an organic solvent, and the second liquid is a solution in which the inorganic-oxide-forming substance is dissolved in the ionic liquid. In this case, examples of the organic solvent in the first liquid include hydrocarbon solvents, such as toluene, hexane, and heptane, and chloroform. As the organic solvent, one or two or more of the above-mentioned solvents are suitably used. From the viewpoint of directly and continuously producing the inorganic oxide in the form of the thin film, among those solvents, toluene, hexane, and heptane are more suitably used as the organic solvent.

At least one of the first and second liquids may contain other additives unless otherwise losing the effect of directly and continuously producing the inorganic oxide in the form of the thin film. From the viewpoint of hydrolysis rate control, at least one of the first and second liquids may contain, for example, an acid, a base, or a chelating agent. Examples of the acid include inorganic acids, such as nitric acid, sulfuric acid, and hydrochloric acid; and organic acids, such as acetic acid, oxalic acid, formic acid, glycolic acid, gluconic acid, lactic acid, tartaric acid, citric acid, malic acid, and succinic acid. Examples of the base include an ammonia solution, and triethanolamine. Examples of the chelating agent include acetylacetone, methyl acetoacetate, ethyl acetoacetate, n-propyl acetoacetate, and isopropyl acetoacetate. The first liquid may contain an inorganic-oxide-forming substance, such as water, unless otherwise losing the effect of directly and continuously producing the inorganic oxide in the form of the thin film.

From the viewpoint of directly and continuously producing the inorganic oxide in the form of the thin film, the first and second liquids suitably phase-separate from each other. The term "phase-separate" used in the present application refers to a state in which, when the first and second liquids are brought into contact with each other, liquid-liquid phase separation is visually observed, and also the term includes a case in which the first and second liquids are compatible with each other to some extent. When the first liquid and the second liquid thus phase-separate from each other, two-dimensional growth of gelation owing to a reaction of the inorganic oxide precursor with the inorganic-oxide-forming substance can be effectively caused in a contact interface between the first and second liquids.

When the first and second liquids phase-separate from each other, the interfacial tension of the first liquid to the second liquid at a temperature at the time of contact between the first and second liquids is, from the viewpoint of directly and continuously producing the inorganic oxide in the form of the thin film, suitably 0.1 mN/m or more, more suitably 0.5 mN/m or more, still more suitably 1 mN/m or more, and from the same viewpoint, suitably 30 mN/m or less, more suitably 15 mN/m or less, still more suitably 10 mN/m or less. The interfacial tension is suitably 0.1 mN/m or more and 30 mN/m or less, more suitably 0.5 mN/m or more and 15 mN/m or less, still more suitably 1 mN/m or more and 10 mN/m or less. The interfacial tension is measured using a Wilhelmy type interfacial tensiometer.

In the mode of contact between the first and second liquids, one or both of the first and second liquids are moved. The mode of contact between the first and second liquids includes a mode of supplying moving one with the other to bring them into contact with each other, and a mode of supplying one staying still with the other to bring them into contact with each other while moving the other. The mode of supplying moving one with the other to bring them into contact with each other includes a mode of supplying one flowing by an external force with the other to bring them into contact with each other and a mode of supplying one transported without an external force acting thereon with the other to bring them into contact with each other. Furthermore, the mode of supplying flowing one with the other to bring them into contact with each other includes a mode of allowing both of the first and second liquids to flow, that is, a mode of allowing the first and second liquids to flow separately and then join together, and a mode of allowing only one of the first and second liquids to flow.

Examples of the mode of allowing both of the first and second liquids to flow and supplying flowing one with the other to bring the liquids into contact with each other include a mode of causing one of the first and second liquids to be joined by the other from behind at an angle with respect to the flow direction of the one to bring the liquids into contact with each other, and then, allowing the liquids to flow in the flow direction of the one; a mode of allowing both of the first and second liquids to flow in the same direction, and while maintaining the flow direction, causing the first and second liquids to join together to bring the liquids into contact with each other; a mode of causing one of the first and second liquids to be joined by the other from the front at an angle with respect to the flow direction of the one to bring the liquids into contact with each other, and then, allowing the liquids to flow in the flow direction of the one; a mode of causing one of the first and second liquids to be joined by the other from a direction perpendicular to the flow direction of the one to bring the liquids into contact with each other, and then, allowing the liquids to flow in the flow direction of the one; and a mode of causing the first and second liquids to face and join together to bring the liquids into contact with each other, and then allowing the liquids to flow in a direction (for example, an orthogonal direction) different from the flow direction of the first and second liquids. Alternatively, there may be adopted a mode of allowing both of the first and second liquids to flow and bringing the first and second liquids into contact with each other so as to cover one of the first and second liquids with the other, thus allowing the whole circumference of the one along a direction perpendicular to the flow direction of the one to have contact with the other.

From the viewpoint of forming a thin film with high selectivity and thereby obtaining an inorganic oxide in the form of a thin film with high production efficiency, the mode of allowing both of the first and second liquids to flow and supplying flowing one with the other to bring the liquids into contact with each other is suitably a mode of bringing one of the first and second liquids into contact with the other from behind at an angle with respect to the flow direction of the one, and then allowing the liquids to flow in the flow direction of the other; or a mode of allowing both of the first and second liquids to flow in the same direction, and bringing the first and second liquids into contact with each other while maintaining the flow direction. In the former mode, from the viewpoint of forming a thin film with high selectivity and thereby obtaining an inorganic oxide in the form of the thin film with high production efficiency, the mode is suitably similar to a mode of allowing the first and second liquids to flow in parallel and come into contact with each other. Hence, an angle θ which the flow direction of one liquid forms with the flow direction of the other liquid is suitably 90° or less, more suitably 60° or less, still more suitably 45° or less.

Examples of the mode of allowing only one of the first and second liquids to flow and supplying the flowing one with the other to bring the liquids into contact with each other include a mode of supplying one of the first and second liquids with the other from behind at an angle with respect to the flow direction of the one to bring the liquids into contact with each other, and then allowing the liquids to flow in the flow direction of the one; a mode of supplying one of the first and second liquids with the other from the front at an angle with respect to the flow direction of the one to bring the liquids into contact with each other, and then allowing the liquids to flow in the flow direction of the one; and a mode of supplying one of the first and second liquids with the other from a direction perpendicular to the flow direction of the one to bring the liquids into contact with each other, and subsequently allowing the liquids to flow in the flow direction of the one. Alternatively, there may be adopted a mode of allowing only one of the first and second liquids to flow and bringing the first and second liquids into contact with each other so as to cover the flowing one with the other, thus allowing the whole circumference of the one in a direction perpendicular to the flow direction of the one to have contact with the other.

In the mode of allowing at least one of the first and second liquids to flow and supplying the flowing one with the other to bring the liquids into contact with each other, examples of a first specific manner of supplying the one with the other include a manner of, as illustrated in FIG. 1, allowing both the first and second liquids, namely, A and B to flow through a passage 11 within a reactor 10 and join together. In this manner, the duration of contact between the first and second liquids can be controlled by the flow rates of the first and second liquids. Furthermore, one or both of the first and second liquids may be composed of a plurality of liquids. Note that an inorganic oxide to be produced can be collected at a point downstream from the confluence portion of the first and second liquids.

Figure 2:
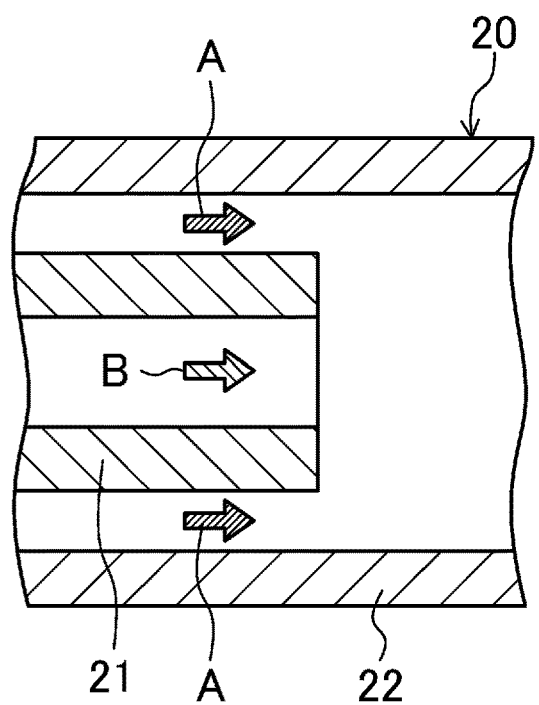
FIG. 2 is a diagram illustrating a second specific manner in which, in a mode of allowing least one of the first liquid and the second liquid to flow and supplying and allowing the flowing one to have contact with the other, the one is supplied with the other.

Examples of a second specific manner of supplying one of the first and second liquids with the other include a manner of, as illustrated in FIG. 2, allowing one, namely A, of the first and second liquids to flow between an inner pipe 21 and an outer pipe 22 of a double pipe reactor 20, and allowing the other, namely B, to flow through the inner pipe 21, and thus causing the liquids to join together so as to cover the other B with the one A. In this case, it is suitable that the second liquid is allowed to flow between the inner pipe 21 and the outer pipe 22, while the first liquid is allowed to flow through the inner pipe 21. In this manner, the duration of contact between the first and second liquids can be controlled by the flow rates of the first and second liquids. Furthermore, one or both of the first and second liquids may be composed of a plurality of liquids. Note that an inorganic oxide to be produced can be collected at a point downstream from the confluence portion of the first and second liquids.

Figure 3:
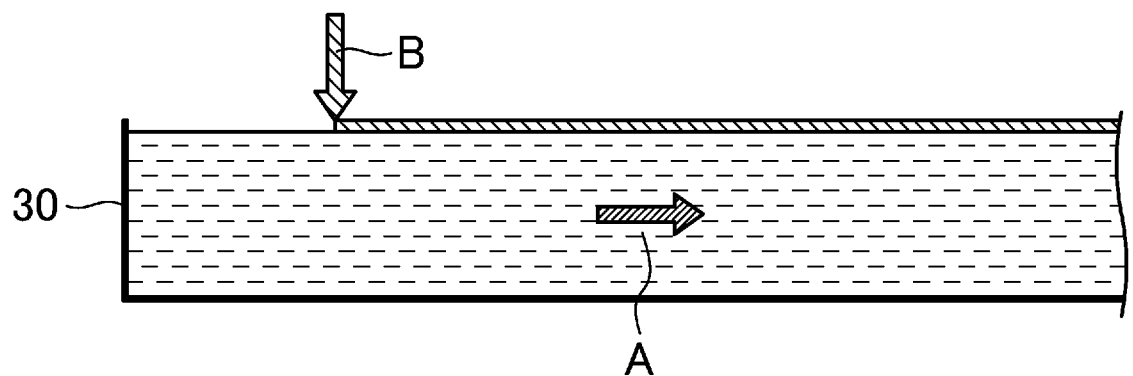
FIG. 3 is a diagram illustrating a third specific manner in which, in a mode of allowing at least one of the first liquid and the second liquid to flow and supplying and allowing the flowing one to have contact with the other, the one is supplied with the other.

Examples of a third specific manner of supplying one of the first and second liquids with the other include a manner of, as illustrated in FIG. 3, allowing one A of the first and second liquids to flow in a liquid tank 30, and supplying the other B to a surface of the one A. In this case, the second liquid is suitably allowed to flow in the liquid tank 30. In this manner, the duration of contact between the first and second liquids can be controlled by the flow rate of the one A. Furthermore, one or both of the first and second liquids may be composed of a plurality of liquids. Examples of a unit for supplying the other B include a unit configured to allow the other B to flow out of the opening of a slit of a nozzle, a unit configured to drop droplets of the other B from a nozzle or a showerhead, and a unit configured to cause the other B exposed to the opening of a coating die to be entrained in the flow of the one A. Furthermore, the unit for supplying the other B may be configured to be movably provided so that a position for supplying the other B to the one A can be changed. Note that an inorganic oxide to be produced can be collected at a downstream portion of the liquid tank 30.

Figure 4:
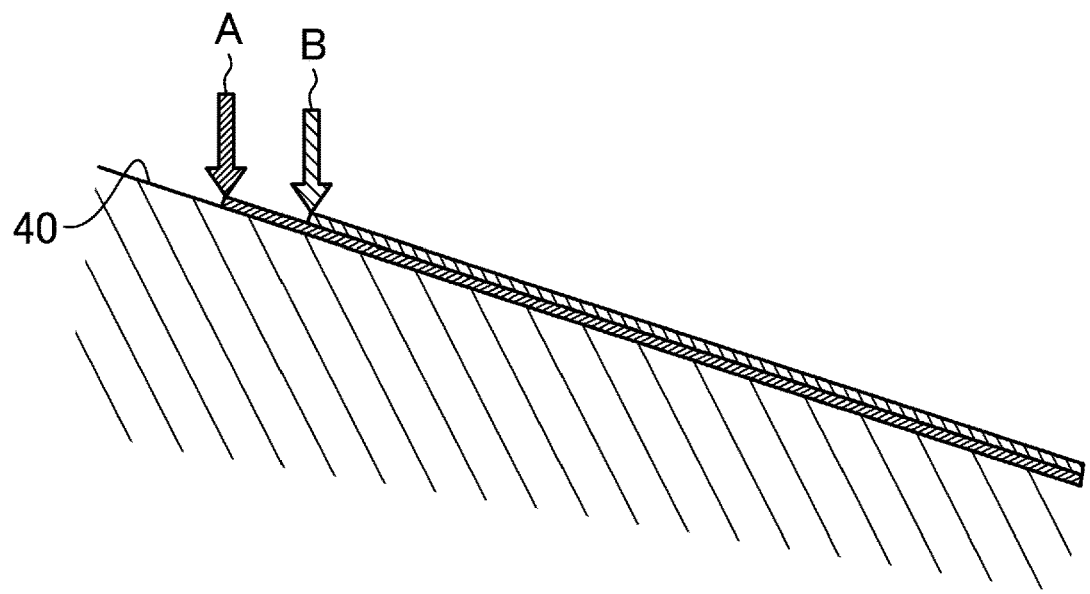
FIG. 4 is a diagram illustrating a fourth specific manner in which, in a mode of allowing at least one of the first liquid and the second liquid to flow and supplying and allowing the flowing one to have contact with the other, the one is supplied with the other.

Examples of a fourth specific manner for supplying one of the first and second liquids with the other include a manner of, as illustrated in FIG. 4, supplying one A of the first and second liquids to a slope 40 to allow the one A to flow under its own weight, and supplying the other B onto a surface of the one A to form a liquid laminated structure. In this case, the second liquid is suitably allowed to flow on the slope 40. The slope 40 suitably has a small contact angle with the one A and has high wettability. In this manner, the duration of contact between the first and second liquids can be controlled by the flow rate of the one A and an angle of inclination of the slope 50. Furthermore, one or both of the first and second liquids may be composed of a plurality of liquids. Examples of a unit for supplying the one A include a unit configured to allow the one A to flow out of the opening of a slit of a nozzle. Furthermore, the unit for supplying the one A may be configured to be movably provided so that a position for supplying the one A onto the slope 40 can be changed. Examples of a unit for supplying the other B include a unit configured to allow the other B to flow out of the opening of a slit of a nozzle, a unit configured to drop droplets of the other B from a nozzle or a showerhead, and a unit configured to cause the other B exposed to the opening of a coating die to be entrained in the flow of the one A. Furthermore, the unit for supplying the other B may be configured to be movably provided so that a position for supplying the other B to the one A can be changed. The units for supplying the one A and the other B respectively may be composed of a single component. Note that an inorganic oxide to be produced can be collected at a downstream portion of the slope 40.

Figure 5:
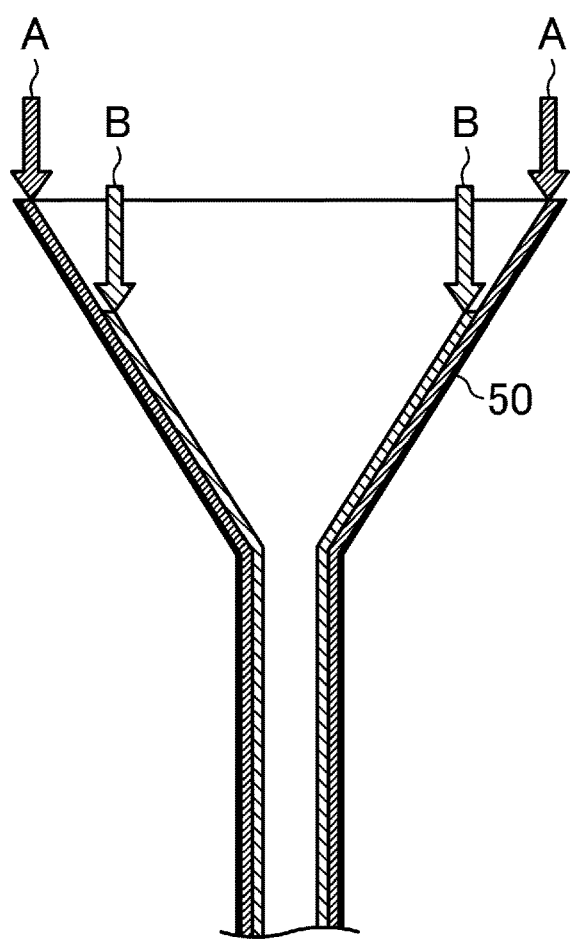
FIG. 5 is a diagram illustrating a fifth specific manner in which, in a mode of allowing at least one of the first liquid and the second liquid to flow and supplying and allowing the flowing one to have contact with the other, the one is supplied with the other.

Examples of a fifth specific manner of supplying one of the first and second liquids with the other include a manner of, as illustrated in FIG. 5, supplying one A of the first and second liquids onto a wall of a funnel 50 to allow the one A to flow under its own weight, and supplying the other B onto a surface of the one A to form a liquid laminated structure. In this case, the second liquid is suitably allowed to flow on the wall of the funnel 50. In this manner, the duration of contact between the first and second liquids can be controlled by the flow rate of the one A and an angle of inclination of the wall of the funnel 50. Furthermore, one or both of the first and second liquids may be composed of a plurality of liquids. Examples of a unit for supplying the one A include a unit configured to allow the one A to flow out of the opening of a slit of a nozzle. Furthermore, the unit for supplying the one A may be configured to be movably provided so that a position for supplying the one A to the funnel 50 can be changed. Examples of a unit for supplying the other B include a unit configured to allow the other B to flow out of the opening of a nozzle, and a unit configured to drop droplets of the other B from a nozzle or a showerhead. Furthermore, the unit for supplying the other B may be configured to be movably provided so that a position for supplying the other B to the one A can be changed. The units for supplying the one A and the other B respectively may be composed of a single component. Note that an inorganic oxide to be produced can be collected at a downstream portion of the funnel 50.

Examples of the mode of supplying transported one of the first and second liquids with the other to bring the liquids into contact with each other include: a mode of allowing one of the first and second liquids to have contact with the other from behind at an angle with respect to the transport direction of the one, and then transporting the liquids in the transport direction of the one; a mode of allowing one of the first and second liquids to have contact with the other from the front at an angle with respect to the transport direction of the one, and then transporting the liquids in the transport direction of the one; and a mode of allowing one of the first and second liquids to have contact with the other from a direction perpendicular to the transport direction of the one, and then transporting the liquids in the transport direction of the one.

Figure 6:
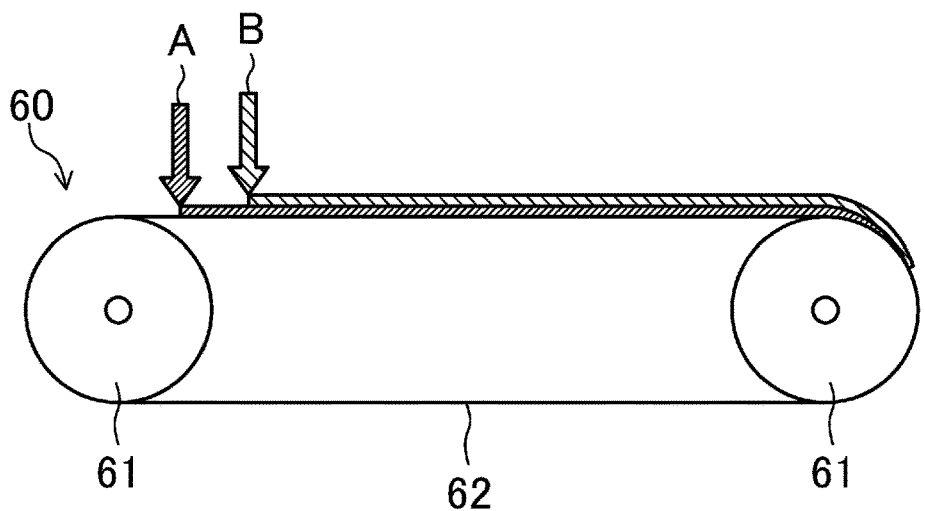
FIG. 6 is a diagram illustrating a specific manner in which, in a mode of supplying and allowing one of the first liquid and the second liquid to be transported to have contact with the other, the one is supplied with the other.

Examples of a specific manner in which, in a mode of supplying transported one of the first and second liquids with the other to bring the liquids into contact with each other, the one is supplied with the other include a manner of, as illustrated in FIG. 6, by using a belt-conveyor system 60, supplying and transporting one A of the first and second liquids onto a conveyor belt 62 that moves while being wound around a pair of rollers 61, and supplying a surface of the one with the other B to form a liquid laminated structure. In this case, the second liquid is suitably supplied onto the conveyor belt 62 to be transported. In this manner, the duration of contact between the first and second liquids can be controlled by the transport speed of the conveyor belt 62. Furthermore, one or both of the first and second liquids may be composed of a plurality of liquids. Examples of a unit for supplying the one A include a unit configured to allow the one A to flow out of the opening of a slit of a nozzle. Furthermore, the unit for supplying the one A may be configured to be movably provided so that a position for supplying the one A to the conveyor belt 62 can be changed. Examples of a unit for supplying the other B include a unit configured to allow the other B to flow out of the opening of a slit of a nozzle, a unit configured to drop droplets of the other B from a nozzle or a showerhead, and a unit configured to cause the other B exposed to the opening of a coating die to be entrained in the transported one A. Furthermore, the unit for supplying the other B may be configured to be movably provided so that a position for supplying the other B to the one A can be changed. The units for supplying the one A and the other B respectively may be composed of a single component. Note that an inorganic oxide to be produced can be collected at a downstream portion of the conveyor belt 62.

Figure 7A:
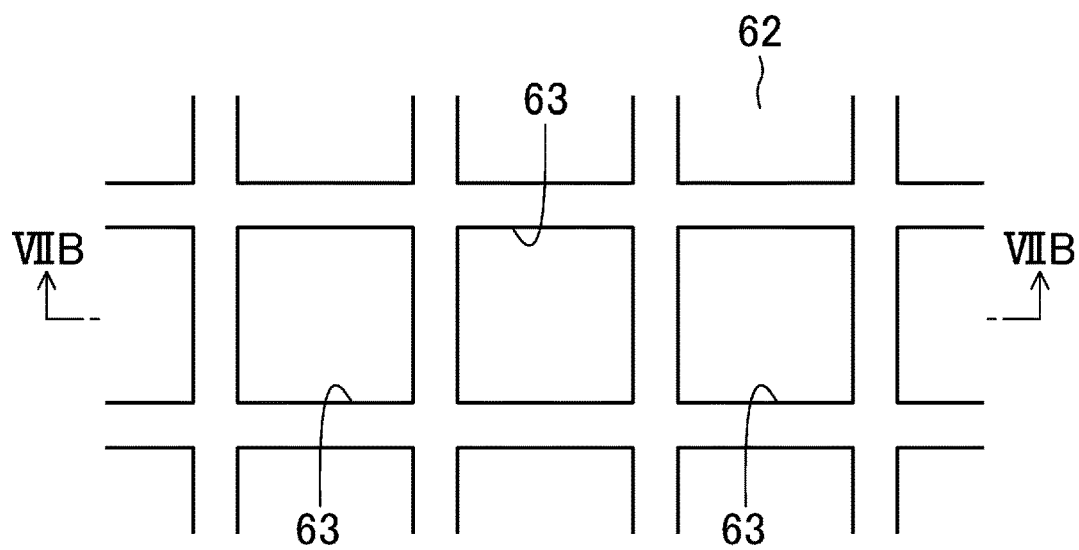
FIG. 7A is a plan view of a part of a belt surface of a conveyor belt in a modification.
Figure 7B:
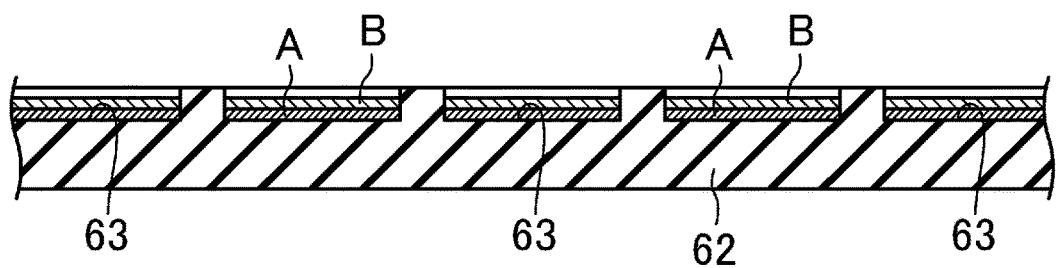
FIG. 7B is a cross-sectional view taken along a line VIIB-VIIB in FIG. 7A.

As illustrated in FIGS. 7A and 7B, the belt-conveyor system 60 may be configured such that a plurality of recesses 63 aligned along the lengthwise direction and the width direction is formed in a surface of the conveyor belt 62, and, in each of the recesses 63, a liquid laminated structure composed of the first and second liquids is formed. Using the belt-conveyor system 60 having this configuration, the first and second liquids react with each other in each of the recesses 63, and accordingly, an inorganic oxide in the form of a thin film with high uniformity can be achieved. Note that a transport unit is not particularly limited to the belt-conveyor system 60, and is only required to have a continuous transport surface along a transport direction.

Figure 8:
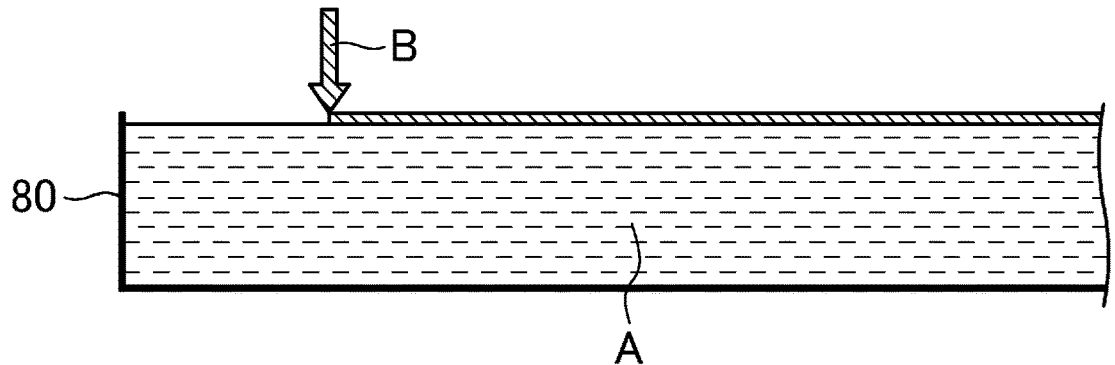
FIG. 8 is a diagram illustrating a specific manner in which, in a mode of supplying and allowing one, staying still, of the first liquid and the second liquid to have contact with the other while allowing the other to move, the one is supplied with the other.

Examples of a specific manner in which, in a mode of supplying staying-still one of the first and second liquids with the other to bring the liquids into contact with each other and moving the other, the one is supplied with the other include a manner of, as illustrated in FIG. 8, storing one A of the first and second liquids in a liquid tank 80, and supplying the other B onto a surface of the one to cause the liquids to flow by an extrusion-and-displacement action. In this case, the second liquid is suitably stored in the liquid tank 80. In this manner, the duration of contact between the first and second liquids can be controlled by the speed of supply of the other B. Furthermore, one or both of the first and second liquids may be composed of a plurality of liquids. Examples of a unit for supplying the other B include a unit configured to allow the other B to flow out of the opening of a slit of a nozzle, and a unit configured to drop droplets of the other B from a nozzle or a showerhead. Furthermore, the unit for supplying the other B may be configured to be movably provided so that a position for supplying the other B to the one A can be changed. Note that an inorganic oxide to be produced can be collected together with an overflow liquid from the liquid tank 80.

The contact of the first and second liquids may be established using a single mode among the above-mentioned modes or using a combination of a plurality of the modes. Furthermore, the contact of the first and second liquids may be established in a state in which, as is the case of using a reactor or other devices, a gas phase is not present and accordingly a free interface is not present. Alternatively, the contact of the first and second liquids may be established in a state in which, as is the case of forming a liquid laminated structure by using a coating die or other devices, a gas phase is present and accordingly a free interface is present.

Figure 9A:
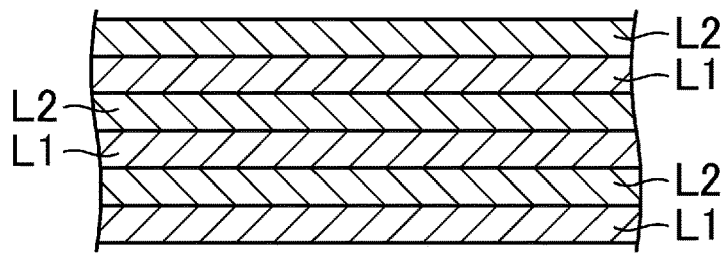
FIG. 9A is a cross-sectional view illustrating a first liquid-laminated structure.
Figure 9B:
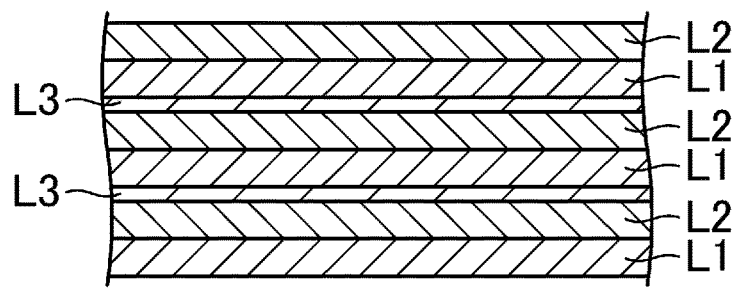
FIG. 9B is a cross-sectional view illustrating a second liquid-laminated structure.
Figure 9C:
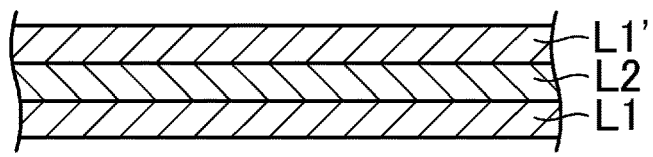
FIG. 9C is a cross-sectional view illustrating a third liquid-laminated structure.

When the first and second liquids are brought into contact with each other to form a liquid laminated structure, as illustrated in FIG. 9A, a structure in which a plurality of the first liquids L1 and a plurality of the second liquids L2 are laminated alternately may be formed. Alternatively, as illustrated in FIG. 9B, a liquid laminated structure may be formed in which a layer of a third liquid L3 not having compatibility with either one of the first liquid L1 or the second liquid L2 and not involved in a reaction between the first liquid L1 and the second liquid L2 is provided between laminated bodies each composed of the first liquid L1 and the second liquid L2. With this structure, the laminated bodies each composed of the first liquid L1 and the second liquid L2 are independent from each other, and accordingly, the unity of an inorganic oxide in the form of a thin film is substantially prevented, and thus, the production efficiency of the inorganic oxide in the form of the thin film can be increased. Alternatively, as illustrated in FIG. 9C, a liquid laminated structure may be formed in which, on each side of the second liquid L2, a corresponding one of the first liquids L1 and L1' containing different types of inorganic oxide precursors is provided. With this structure, an inorganic oxide in the form of a thin film in which different types of inorganic oxides are bonded together can be achieved.

At the inorganic-oxide-formation step in the method for producing the inorganic oxide in the form of the thin film according to the embodiment, in the case of moving both of the first and second liquids, the ratio (molar movement rate ratio=$m_2/m_1$) of the molar movement rate $m_2$ of the inorganic-oxide-forming substance of the second liquid to the molar movement rate $m_1$ of the inorganic oxide precursor of the first liquid at the time of contact between the first and second liquids is, from the viewpoint of directly and continuously producing the inorganic oxide in the form of the thin film, suitably 2 or more, more suitably 10 or more, still more suitably 50 or more, and from the viewpoint of economic efficiency, suitably 300 or less, more suitably 200 or less, still more suitably 150 or less. This molar movement rate ratio ($m_2/m_1$) is suitably 2 or more and 300 or less, more suitably 10 or more and 200 or less, still more suitably 50 or more and 150 or less. However, in the case of using the second liquid repeatedly by circulation or other ways, the problem of economic efficiency can be naturally avoided, and therefore, the molar movement rate ratio ($m_2/m_1$) may be a value of the order of a thousand or ten thousands. Note that the molar movement rate $m_1$ of the first liquid can be controlled by the inorganic oxide precursor content $c_1$ of the first liquid and the flow rate $Q_1$ or the transport rate $Q_1'$ of the first liquid. The molar movement rate $m_1$ of the first liquid is calculated using the flow rate $Q_1$ or the transport rate $Q_1'$ of the first liquid, the inorganic oxide precursor content $c_1$ of the first liquid, the density of the first liquid, and the molecular weight of the inorganic oxide precursor in the first liquid. The molar movement rate $m_2$ of the second liquid can be controlled by the inorganic-oxide-forming substance content $c_2$ of the second liquid and the flow rate $Q_2$ or the transport rate $Q_2'$ of the second liquid. The molar movement rate $m_2$ of the second liquid is calculated using the flow rate $Q_2$ or the transport rate $Q_2'$ of the second liquid, the inorganic-oxide-forming substance content $c_2$ of the second liquid, the density of the second liquid, and the molecular weight of the inorganic-oxide-forming substance in the second liquid.

In the case where the first liquid is allowed to flow, the linear flow velocity $u_1$ of the first liquid at the time of contact between the first and second liquids is, from the viewpoint of directly and continuously producing the inorganic oxide in the form of the thin film, suitably 0.0001 m/s or more, more suitably 0.01 m/s or more, still more suitably 0.03 m/s or more, and from the same viewpoint, suitably 100 m/s or less, more suitably 60 m/s or less, still more suitably 10 m/s or less. The linear flow velocity $u_1$ of the first liquid is suitably 0.0001 m/s or more and 100 m/s or less, more suitably 0.01 m/s or more and 60 m/s or less, still more suitably 0.03 m/s or more and 10 m/s or less.

In the case where the second liquid is allowed to flow, the linear flow velocity $u_2$ of the second liquid at the time of contact between the first and second liquids is, from the viewpoint of directly and continuously producing the inorganic oxide in the form of the thin film, suitably 0.001 m/s or more, more suitably 0.01 m/s or more, still more suitably 0.03 m/s or more, and from the same viewpoint, suitably 100 m/s or less, more suitably 60 m/s or less, still more suitably 10 m/s or less. The linear flow velocity $u_2$ of the second liquid is suitably 0.001 m/s or more and 100 m/s or less, more suitably 0.01 m/s or more and 60 m/s or less, still more suitably 0.03 m/s or more and 10 m/s or less.

Note that the linear flow velocity $u_1$ of the first liquid and the linear flow velocity $u_2$ of the second liquid can be controlled by the flow rate $Q_1$ of the first liquid, the flow rate $Q_2$ of the second liquid respectively, and by the shape of a device. Furthermore, in each of the modes of contact between the first and second liquids illustrated in FIGS. 1 and 2, the linear flow velocity $u_1$ of the first liquid and the linear velocity $u_2$ of the second liquid can be calculated by dividing the respective flow rates $Q_1$ and $Q_2$ by the passage area of a cross-section at a confluence portion, the cross-section being perpendicular to the flow direction after the confluence. In each of the modes of contact between the first and second liquids illustrated in FIGS. 3 to 8, the linear flow velocity $u_1$ of the first liquid and the linear flow velocity $u_2$ of the second liquid can be calculated by dividing the respective flow rates $Q_1$ and $Q_2$ by the passage area of a cross-section perpendicular to the flow direction of the liquids when the liquid laminated structure is formed.

In the case where both of the first and second liquids are allowed to flow, the linear flow velocity $u_1$ of the first liquid and the linear flow velocity $u_2$ of the second liquid at the time of contact between the first and second liquids are suitably in the above-mentioned range. Furthermore, the linear flow velocity $u_1$ of the first liquid may be equal to the linear flow velocity $u_2$ of the second liquid, or may be higher or lower than the linear flow velocity $u_2$ of the second liquid. The ratio ($u_1/u_2$) of the linear flow velocity $u_1$ of the first liquid to the linear flow velocity $u_2$ of the second liquid at the time of contact between the first and second liquids is, from the viewpoint of directly and continuously producing the inorganic oxide in the form of the thin film, suitably 0.01 or more, more suitably 0.3 or more, still more suitably 0.5 or more, and from the same viewpoint, suitably 100 or less, more suitably 60 or less, still more suitably 10 or less. The linear flow velocity ratio ($u_1/u_2$) is suitably 0.01 or more and 100 or less, more suitably 0.3 or more and 60 or less, still more suitably 0.5 or more and 10 or less.

Furthermore, in the case where the first liquid is allowed to flow, from the viewpoint of directly and continuously producing the inorganic oxide in the form of the thin film, the first liquid suitably flows under a laminar flow condition until the time when the first and second liquids come into contact with each other, specifically until just before the contact. The Reynolds number $Re_1$ of the first liquid until the time when the first and second liquids come into contact with each other is, from the viewpoint of directly and continuously producing the inorganic oxide in the form of the thin film, suitably 0.1 or more, more suitably 1 or more, still more suitably 5 or more, and from the same viewpoint, suitably 3000 or less, more suitably 500 or less, still more suitably 100 or less. The Reynolds number $Re_1$ of the first liquid is suitably 0.1 or more and 3000 or less, more suitably 1 or more and 500 or less, still more suitably 5 or more and 100 or less. Note that the Reynolds number $Re_1$ of the first liquid can be controlled by the flow rate $Q_1$ of the first liquid.

In the case where the second liquid is allowed to flow, from the viewpoint of directly and continuously producing the inorganic oxide in the form of the thin film, the second liquid suitably flows under a laminar flow condition until the time when the first and second liquids come into contact with each other, specifically until just before the contact. The Reynolds number $Re_2$ of the second liquid until the time when the first and second liquids come into contact with each other is, from the viewpoint of directly and continuously producing the inorganic oxide in the form of the thin film, suitably 0.01 or more, more suitably 0.05 or more, still more suitably 0.1 or more, and from the same viewpoint, suitably 500 or less, more suitably 100 or less, still more suitably 50 or less. The Reynolds number $Re_2$ of the second liquid is suitably 0.01 or more and 500 or less, more suitably 0.05 or more and 100 or less, still more suitably 0.1 or more and 50 or less. Note that the Reynolds number $Re_2$ of the second liquid can be controlled by the flow rate $Q_2$ of the second liquid.

In the case where both of the first and second liquids are allowed to flow, the Reynolds number $Re_1$ of the first liquid and the Reynolds number $Re_2$ of the second liquid until the time when the first and second liquids come into contact with each other are suitably in the above-mentioned ranges. Furthermore, the Reynolds number $Re_1$ of the first liquid may be equal to the Reynolds number $Re_2$ of the second liquid, or may be larger or smaller than the Reynolds number $Re_2$ of the second liquid. The ratio ($Re_1/Re_2$) of the Reynolds number $Re_1$ of the first liquid to the Reynolds number $Re_2$ of the second liquid until the time when the first and second liquids come into contact with each other is, from the viewpoint of directly and continuously producing the inorganic oxide in the form of the thin film, suitably 0.01 or more, more suitably 0.1 or more, still more suitably 1 or more, still further more suitably 5 or more, still further more suitably 10 or more, still further more suitably 15 or more, and from the same viewpoint, suitably 1000 or less, more suitably 500 or less, still more suitably 200 or less, still further more suitably 100 or less, still further more suitably 50 or less, still further more suitably 30 or less, still further more suitably 25 or less. The Reynolds number ratio ($Re_1/Re_2$) is suitably 0.01 or more and 1000 or less, more suitably 0.1 or more and 500 or less, still more suitably 1 or more and 200 or less, still further more suitably 5 or more and 100 or less, still further more suitably 10 or more and 50 or less, still further more suitably 15 or more and 30 or less, still further more suitably 15 or more and 25 or less.

The duration of contact between the first and second liquids is, from the viewpoint of directly and continuously producing the inorganic oxide in the form of the thin film, suitably 0.5 sec or longer, more suitably 1.0 sec or longer, still more suitably 2.0 sec or longer, and from the same viewpoint, suitably 600 sec or shorter, more suitably 180 sec or shorter, still more suitably 100 sec or shorter, still further more suitably 50 sec or shorter, still further more suitably 10 sec or shorter. This duration of contact is suitably 0.5 sec or longer and 600 sec or shorter, more suitably 1.0 sec or longer and 180 sec or shorter, still more suitably 2.0 sec or longer and 100 sec or shorter, still further more suitably 2.0 sec or longer and 50 sec or shorter, still further more suitably 2.0 sec or longer and 10 sec or shorter.

The reaction temperature at the time of contact between the first and second liquids is, from the viewpoints of the rate of reaction, yield, and viscosity, suitably 0° C. or higher, more suitably 5° C. or higher, still more suitably 10° C. or higher. Furthermore, from the viewpoint of reaction control, the reaction temperature is suitably 100° C. or lower, more suitably 60° C. or lower, still more suitably 35° C. or lower. This reaction temperature is suitably 0° C. or higher and 100° C. or lower, more suitably 5° C. or higher and 60° C. or lower, still more suitably 10° C. or higher and 35° C. or lower.

The method for producing the inorganic oxide in the form of the thin film according to the embodiment includes: after obtaining a slurry containing an inorganic-oxide gel in the form of a thin film in the inorganic-oxide-formation step, separating the inorganic oxide gel in the form of the thin film from the slurry by filtration or other ways; and drying and baking the resultant gel to finally obtain a solid inorganic oxide in the form of a thin film.

The average longitudinal diameter (the maximum diameter) of the inorganic oxide in the form of the thin film obtained by the production method according to the embodiment is suitably 2 µm or larger, more suitably 5 µm or larger, still more suitably 10 µm or larger, and suitably 300 µm or smaller, more suitably 100 µm or smaller, still more suitably 50 µm or smaller. This average longitudinal diameter is suitably 2 µm or larger and 300 µm or smaller, more suitably 5 µm or larger and 100 µm or smaller, still more suitably 10 µm or larger and 50 µm or smaller. The average longitudinal diameter is determined as the average of longitudinal diameters of 500 data points measured by the microscopic observation of then obtained inorganic oxide in the form of the thin film.

The average thickness of the inorganic oxide in the form of the thin film is suitably 0.01 µm or larger, more suitably 0.05 µm or larger, still more suitably 0.1 µm or larger, and suitably 1.5 µm or smaller, more suitably 1 µm or smaller, still more suitably 0.8 µm or smaller, still more suitably 0.5 µm or smaller, still more suitably 0.4 µm or smaller, still more suitably 0.3 µm or smaller. This average thickness is suitably 0.01 µm or larger and 1.5 µm or smaller, more suitably 0.05 µm or larger and 1 µm or smaller, still more suitably 0.1 µm or larger and 0.8 µm or smaller, still more suitably 0.1 µm or larger and 0.5 µm or smaller, still more suitably 0.1 µm or larger and 0.4 µm or smaller, still more suitably 0.1 µm or larger and 0.3 µm or smaller. The average thickness is determined as the average thickness of the cross-sections of 20 pieces obtained by cutting the obtained inorganic oxide in the form of the film and measured by microscopic observation.

The ratio of the average longitudinal diameter of the inorganic oxide in the form of the thin film to the average thickness thereof is suitably 5 or more, more suitably 30 or more, still more suitably 50 or more, and suitably 2000 or less, more suitably 800 or less, still more suitably 500 or less. This ratio is suitably 5 or more and 2000 or less, more suitably 30 or more and 800 or less, still more suitably 50 or more and 500 or less.

As for the above-mentioned embodiment, the following configurations are further disclosed.

<1> A method for producing an inorganic oxide in the form of a thin film, the method comprising a step of bringing a first liquid and a second liquid into contact with each other, the first liquid containing an inorganic oxide precursor and the second liquid containing a substance reacting with the inorganic oxide precursor of the first liquid to form an inorganic oxide derived from the inorganic oxide precursor, wherein the step is performed by continuous operation, and at least one of the first and second liquids includes an ionic liquid.

<2> The method, according to <1>, for producing the inorganic oxide in the form of the thin film, wherein the first liquid is a solution in which the inorganic oxide precursor is dissolved in a solvent.

<3> The method, according to <1> or <2>, for producing the inorganic oxide in the form of the thin film wherein the first liquid suitably contains one or two or more of toluene, hexane, heptane, benzene, and chloroform, more suitably contains one or two or more of toluene, hexane, and heptane.

<4> The method, according to any one of <1> to <3>, for producing the inorganic oxide in the form of the thin film, wherein the inorganic oxide precursor includes an inorganic substance having a hydrolyzable functional group from which the inorganic oxide is derived by sol-gel transition accompanied by a hydrolysis reaction and a polycondensation reaction.

<5> The method, according to any one of <1> to <4>, for producing the inorganic oxide in the form of the thin film, wherein the inorganic oxide precursor includes one or two or more of an alkoxide, a halide, a salt having a hydrolyzable functional group, a coordination compound having a hydrolyzable functional group, and amines of the inorganic oxide.

<6> The method, according to any one of <1> to <5>, for producing the inorganic oxide in the form of the thin film, wherein the inorganic oxide precursor is suitably an alkoxide, more suitably a metal alkoxide, still more suitably a titanium alkoxide and a zirconium alkoxide, still further more suitably a titanium alkoxide and a zirconium alkoxide each having an alkyl group having 2 to 4, inclusive, carbon atoms.

<7> The method, according to <6>, for producing the inorganic oxide in the form of the thin film, wherein the titanium alkoxide includes tetraethyl orthotitanate, tetraisopropyl orthotitanate, or tetra-n-butyl orthotitanate.

<8> The method, according to <6>, for producing the inorganic oxide in the form of the thin film, wherein the zirconium alkoxide includes tetraethyl orthozirconate, tetraisopropyl orthozirconate, or tetra-n-butyl orthozirconate.

<9> The method, according to any one of <1> to <8>, for producing the inorganic oxide in the form of the thin film, wherein the inorganic oxide precursor content of the first liquid is suitably 1% by mass or more, more suitably 5% by mass or more, still more suitably 8% by mass or more, and suitably 80% by mass or less, more suitably 70% by mass or less, still more suitably 60% by mass or less, still further more suitably 50% by mass or less, still further more suitably 40% by mass or less.

<10> The method, according to any one of <1> to <9>, for producing the inorganic oxide in the form of the thin film, wherein the inorganic oxide precursor content is suitably 1% by mass or more and 80% by mass or less, more suitably 5% by mass or more and 70% by mass or less, still more suitably 8% by mass or more and 60% by mass or less, still further more suitably 8% by mass or more and 50% by mass or less, still further more suitably 8% by mass or more and 40% by mass or less.

<11> The method, according to any one of <1> to <10>, for producing the inorganic oxide in the form of the thin film, wherein the inorganic-oxide-forming substance content of the second liquid is suitably 0.1% by mass or more, more suitably 0.5% by mass or more, still more suitably 0.8% by mass or more, and suitably 70% by mass or less, more suitably 30% by mass or less, still more suitably 20% by mass or less.

<12> The method, according to any one of <1> to <11>, for producing the inorganic oxide in the form of the thin film, wherein the inorganic-oxide-forming substance content of the second liquid is suitably 0.1% by mass or more and 70% by mass or less, more suitably 0.5% by mass or more and 30% by mass or less, still more suitably 0.8% by mass or more and 20% by mass or less.

<13> The method, according to any one of <1> to <12>, for producing the inorganic oxide in the form of the thin film, wherein cations of the ionic liquid include ammonium cations.

<14> The method, according to <13>, for producing the inorganic oxide in the form of the thin film, wherein the ammonium cations include 1-alkyl-3-alkylimidazolium cations of the following Formula (1).

[Formula 1-2]

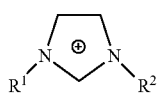
(1)

(where $R^1$ is an alkyl group having 12 or less carbon atoms, or a functional group in which one or two or more oxygen atoms are introduced between carbon atomic bonds of an alkyl group so as to form an ether linkage and the total of the number of the carbon atoms and the number of the oxygen atoms is 12 or less; and $R^2$ is an alkyl group having 1 to 4, inclusive, carbon atoms, or a hydrogen atom.)

<15> The method, according to <13> or <14>, for producing the inorganic oxide in the form of the thin film, wherein the ammonium cations include suitably 1-alkyl-3-methylimidazolium cations, more suitably 1-methyl-3-methylimidazolium cations, 1-ethyl-3-methylimidazolium cations, 1-propyl-3-methylimidazolium cations, or 1-butyl-3-methylimidazolium cations.

<16> The method, according to any one of <13> to <15>, for producing the inorganic oxide in the form of the thin film, wherein the ammonium cations include N-alkylpyridium cations of the following Formula (2).

[Formula 2-2]

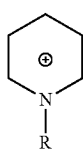
(2)

(where R is an alkyl group having 12 or less carbon atoms, or a functional group in which one or two or more oxygen atoms are introduced between carbon atomic bonds of an alkyl group so as to form an ether linkage, and the total of the number of the carbon atoms and the number of the oxygen atoms is 12 or less).

<17> The method, according to any one of <13> to <16>, for producing the inorganic oxide in the form of the thin film, wherein the ammonium cations include 1-methylpyridium cations, 1-ethylpyridium cations, 1-propylpyridium cations, or 1-butylpyridium cations.

<18> The method, according to any one of <13> to <17>, for producing the inorganic oxide in the form of the thin film, wherein the ammonium cations include cations of the following Formula (3).

$$[NR_xH_{4-x}]^+ \quad (3)$$

(where R is an alkyl group having 12 or less carbon atoms, or a functional group in which one or two or more oxygen atoms are introduced between carbon atomic bonds of an alkyl group so as to form an ether linkage and the total of the number of the carbon atoms and the number of the oxygen atoms is 12 or less; and X is an integer of 0 to 4 inclusive.)

<19> The method, according to any one of <13> to <18>, for producing the inorganic oxide in the form of the thin film, wherein the ammonium cations include N,N,N-triethyl-N-propylammonium cations, tetramethylammonium cations, tetraethylammonium cations, or ethyldimethylpropylammonium cations.

<20> The method, according to any one of <1> to <19>, for producing the inorganic oxide in the form of the thin film, wherein the cations of the ionic liquid include phosphonium cations.

<21> The method, according to <20>, for producing the inorganic oxide in the form of the thin film, wherein the phosphonium cations include cations of the following Formula (4).

$$[PR_xH_{4-x}]^+ \quad (4)$$

(where R is an alkyl group having 12 or less carbon atoms, or a functional group in which one or two or more oxygen atoms are introduced between carbon atomic bonds of an alkyl group so as to form an ether linkage and the total of the number of the carbon atoms and the number of the oxygen atoms is 12 or less; and X is an integer of 0 to 4 inclusive.)

<22> The method, according to <20> or <21>, for producing the inorganic oxide in the form of the thin film, wherein the phosphonium cations include tetramethylphosphonium cations, tetraethylphosphonium cations, or tributylmethylphosphonium cations.

<23> The method, according to any one of <1> to <22>, for producing the inorganic oxide in the form of the thin film, wherein anions of the ionic liquid include bis(trifluoromethylsulfonyl)amide anions ($[(CF_3SO_2)_2N]^-$), ethyl sulfate anions ($[C_2H_5OSO_3]^-$), bis(fluorosulfonyl)amide anions ($[(FSO_2)_2N]^-$), dicyanamide anions ($[(CN)_2N]^-$), tetrafluoroborate anions ($BF_4^-$), hexafluorophosphate anions ($PF_6^-$), halide anions ($Cl^-$, $Br^-$, $I^-$), or trifluoromethanesulfonate anions ($[CF_3SO_3]^-$).

<24> The method, according to any one of <1> to <23>, for producing the inorganic oxide in the form of the thin film, wherein the second liquid is a solution in which the inorganic-oxide-forming substance is dissolved in the ionic liquid.

<25> The method, according to <24>, for producing the inorganic oxide in the form of the thin film, wherein the first liquid is a solution in which any ionic liquid is not contained and the inorganic oxide precursor is dissolved in an organic solvent.

<26> The method, according to any one of <1> to <25>, for producing the inorganic oxide in the form of the thin film, wherein the first liquid and the second liquid phase-separate from each other.

<27> The method, according to <26>, for producing the inorganic oxide in the form of the thin film, wherein the interfacial tension of the first liquid to the second liquid at a temperature at the time of contact between the first and second liquids is suitably 0.1 mN/m or more, more suitably 0.5 mN/m or more, still more suitably 1 mN/m or more, and suitably 30 mN/m or less, more suitably 15 mN/m or less, still more suitably 10 mN/m or less.

<28> The method, according to <26> or <27>, for producing the inorganic oxide in the form of the thin film, wherein the interfacial tension of the first liquid to the second liquid at a temperature at the time of contact between the first and second liquids is suitably 0.1 mN/m or more and 30 mN/m or less, more suitably 0.5 mN/m or more and 15 mN/m or less, still more suitably 1 mN/m or more and 10 mN/m or less.

<29> The method, according to any one of <1> to <28>, for producing the inorganic oxide in the form of the thin film, wherein the mode of contact between the first and second liquids includes a mode of supplying moving one of the first and second liquids with the other to bring the liquids into contact with each other.

<30> The method, according to <29>, for producing the inorganic oxide in the form of the thin film, wherein the ratio of the molar movement rate of the inorganic-oxide-forming substance of the second liquid to the molar movement rate of the inorganic oxide precursor of the first liquid at the time of contact between the first and second liquids is suitably 2 or more, more suitably 10 or more, still more suitably 50 or more, and suitably 300 or less, more suitably 200 or less, still more suitably 150 or less.

<31> The method, according to <29> or <30>, for producing the inorganic oxide in the form of the thin film, wherein the ratio of the molar movement rate of the inorganic-oxide-forming substance of the second liquid to the molar movement rate of the inorganic oxide precursor of the first liquid at the time of contact between the first and second liquids is suitably 2 or more and 300 or less, more suitably 10 or more and 200 or less, still more suitably 50 or more and 150 or less.

<32> The method, according to any one of <29> to <31>, for producing the inorganic oxide in the form of the thin film, wherein the mode of contact between the first and second liquids includes a mode of supplying flowing one of the first and second liquids with the other to bring the liquids into contact with each other.

<33> The method, according to <32>, for producing the inorganic oxide in the form of the thin film, wherein, when the first liquid is allowed to flow, the linear flow velocity of the first liquid at the time of contact between the first and second liquids is suitably 0.0001 m/s or more, more suitably 0.01 m/s or more, still more suitably 0.03 m/s or more, and suitably 100 m/s or less, more suitably 60 m/s or less, still more suitably 10 m/s or less.

<34> The method, according to <32> or <33>, for producing the inorganic oxide in the form of the thin film, wherein, when the first liquid is allowed to flow, the linear flow velocity of the first liquid at the time of contact between the first and second liquids is suitably 0.0001 m/s or more and 100 m/s or less, more suitably 0.01 m/s or more and 60 m/s or less, still more suitably 0.03 m/s or more and 10 m/s or less.

<35> The method, according to any one of <32> to <34>, for producing the inorganic oxide in the form of the thin film, wherein, when the second liquid is allowed to flow, the linear flow velocity of the second liquid at the time of contact between the first and second liquids is suitably 0.001 m/s or more, more suitably 0.01 m/s or more, still more suitably 0.03 m/s or more, and suitably 100 m/s or less, more suitably 60 m/s or less, still more suitably 10 m/s or less.

<36> The method, according to any one of <32> to <35>, for producing the inorganic oxide in the form of the thin film, wherein, when the second liquid is allowed to flow, the linear flow velocity of the second liquid at the time of contact between the first and second liquids is suitably 0.001 m/s or more and 100 m/s or less, more suitably 0.01 m/s or more and 60 m/s or less, still more suitably 0.03 m/s or more and 10 m/s or less.

<37> The method, according to any one of <32> to <36>, for producing the inorganic oxide in the form of the thin film, wherein, when the first liquid is allowed to flow, the first liquid flows under a laminar flow condition until the time when the first and second liquids come into contact with each other.

<38> The method, according to any one of <32> to <37>, for producing the inorganic oxide in the form of the thin film, wherein, when the first liquid is allowed to flow, the Reynolds number of the first liquid until the time when the first and second liquids come into contact with each other is suitably 0.1 or more, more suitably 1 or more, still more suitably 5 or more, and suitably 3000 or less, more suitably 500 or less, still more suitably 100 or less.

<39> The method, according to any one of <32> to <38>, for producing the inorganic oxide in the form of the thin film, wherein, when the first liquid is allowed to flow, the Reynolds number of the first liquid until the time when the first and second liquids come into contact with each other is suitably 0.1 or more and 3000 or less, more suitably 1 or more and 500 or less, still more suitably 5 or more and 100 or less.

<40> The method, according to any one of <32> to <39>, for producing the inorganic oxide in the form of the thin film, wherein, when the second liquid is allowed to flow, the second liquid flows under a laminar flow condition until the time when the first and second liquids come into contact with each other.

<41> The method, according to any one of <32> to <40>, for producing the inorganic oxide in the form of the thin film, wherein, when the second liquid is allowed to flow, the Reynolds number of the second liquid until the time when the first and second liquids come into contact with each other is suitably 0.01 or more, more suitably 0.05 or more, still more suitably 0.1 or more, and suitably 500 or less, more suitably 100 or less, still more suitably 50 or less.

<42> The method, according to any one of <32> to <41>, for producing the inorganic oxide in the form of the thin film, wherein, when the second liquid is allowed to flow, the Reynolds number of the second liquid until the time when the first and second liquids come into contact with each other is suitably 0.01 or more and 500 or less, more suitably 0.05 or more and 100 or less, still more suitably 0.1 or more and 50 or less.

<43> The method, according to any one of <32> to <42>, for producing the inorganic oxide in the form of the thin film, wherein the mode of contact between the first and second liquids includes a mode of causing both of the first and second liquids to flow and join together.

<44> The method, according to <43>, for producing the inorganic oxide in the form of the thin film, wherein the linear flow velocity of the first liquid at the time of contact between the first and second liquids is equal to the linear flow velocity of the second liquid, or higher than the linear flow velocity of the second liquid.

<45> The method, according to <43> or <44>, for producing the inorganic oxide in the form of the thin film, wherein the ratio of the linear flow velocity of the first liquid to the linear flow velocity of the second liquid at the time of contact between the first and second liquids is suitably 0.01 or more, more suitably 0.3 or more, still more suitably 0.5 or more, and suitably 100 or less, more suitably 60 or less, still more suitably 10 or less.

<46> The method, according to any one of <43> to <45>, for producing the inorganic oxide in the form of the thin film, wherein the ratio of the linear flow velocity of the first liquid to the linear flow velocity of the second liquid at the time of contact between the first and second liquids is suitably 0.01 or more and 100 or less, more suitably 0.3 or more and 60 or less, still more suitably 0.5 or more and 10 or less.

<47> The method, according to any one of <43> to <46>, for producing the inorganic oxide in the form of the thin film, wherein, when both of the first and second liquids are allowed to flow, the ratio of the Reynolds number of the first liquid to the Reynolds number of the second liquid until the time when the first and second liquids come into contact with each other is suitably 0.01 or more, more suitably 0.1 or more, still more suitably 1 or more, still further more suitably 5 or more, still further more suitably 10 or more, still further more suitably 15 or more, and suitably 1000 or less, more suitably 500 or less, still more suitably 200 or less, still further more suitably 100 or less, still further more suitably 50 or less, still further more suitably 30 or less, still further more suitably 25 or less.

<48> The method, according to any one of <43> to <47>, for producing the inorganic oxide in the form of the thin film, wherein, when both of the first and second liquids are allowed to flow, the ratio of the Reynolds number of the first liquid to the Reynolds number of the second liquid until the time when the first and second liquids come into contact with each other is suitably 0.01 or more and 1000 or less, more suitably 0.1 or more and 500 or less, still more suitably 1 or more and 200 or less, still further more suitably 5 or more and 100 or less, still further more suitably 10 or more and 50 or less, still further more suitably 15 or more and 30 or less, still further more suitably 15 or more and 25 or less.

<49> The method, according to any one of <32> to <48>, for producing the inorganic oxide in the form of the thin film, wherein the mode of contact between the first and second liquids includes a mode of allowing only one of the first and second liquids to flow.

<50> The method, according to any one of <29> to <49>, for producing the inorganic oxide in the form of the thin film, wherein the mode of contact between the first and second liquids includes a mode of supplying transported one of the first and second liquids with the other to bring the liquids into contact with each other.

<51> The method, according to any one of <1> to <50>, for producing the inorganic oxide in the form of the thin film, wherein the mode of contact between the first and second liquids includes a mode of supplying staying-still one of the first and second liquids with the other to bring the liquids into contact with each other while moving the other.

<52> The method, according to any one of <1> to <51>, for producing the inorganic oxide in the form of the thin film, wherein the contact of the first and second liquids is established in a state in which a gas phase is not present and accordingly a free interface is not present.

<53> The method, according to any one of <1> to <51>, for producing the inorganic oxide in the form of the thin film, wherein the contact of the first and second liquids is realized in a state in which a gas phase is present, and a free interface is present, accordingly.

<54> The method, according to any one of <1> to <53>, for producing the inorganic oxide in the form of the thin film, wherein the duration of contact between the first and second liquids is suitably 0.5 sec or longer, more suitably 1.0 sec or longer, still more suitably 2.0 sec or longer, and suitably 600 sec or shorter, more suitably 180 sec or shorter, still more suitably 100 sec or shorter, still further more suitably 50 sec or shorter, still further more suitably 10 sec or shorter.

<55> The method, according to any one of <1> to <54>, for producing the inorganic oxide in the form of the thin film, wherein the duration of contact between the first and second liquids is suitably 0.5 sec or longer and 600 sec or shorter, more suitably 1.0 sec or longer and 180 sec or shorter, still more suitably 2.0 sec or longer and 100 sec or shorter, still further more suitably 2.0 sec or longer and 50 sec or shorter, still further more suitably 2.0 sec or longer and 10 sec or shorter.

<56> The method, according to any one of <1> to <55>, for producing the inorganic oxide in the form of the thin film, wherein the reaction temperature at the time of contact between the first and second liquids is suitably 0° C. or higher, more suitably 5° C. or higher, still more suitably 10° C. or higher, and suitably 100° C. or lower, more suitably 60° C. or lower, still more suitably 35° C. or lower.

<57> The method, according to any one of <1> to <56>, for producing the inorganic oxide in the form of the thin film, wherein the reaction temperature at the time of contact between the first and second liquids is suitably 0° C. or higher and 100° C. or lower, more suitably 5° C. or higher and 60° C. or lower, still more suitably 10° C. or higher and 35° C. or lower.

<58> The method, according to any one of <1> to <57>, for producing the inorganic oxide in the form of the thin film, wherein the average longitudinal diameter of the inorganic oxide in the form of the thin film is suitably 2 μm or larger, more suitably 5 μm or larger, still more suitably 10 μm or larger, and suitably 300 μm or smaller, more suitably 100 μm or smaller, still more suitably 50 μm or smaller.

<59> The method, according to any one of <1> to <58>, for producing the inorganic oxide in the form of the thin film, wherein the average longitudinal diameter is suitably 2 μm or larger and 300 μm or smaller, more suitably 5 μm or larger and 100 μm or smaller, still more suitably 10 μm or larger and 50 μm or smaller.

<60> The method, according to any one of <1> to <59>, for producing the inorganic oxide in the form of the thin film, wherein the average thickness of the inorganic oxide in the form of the thin film is suitably 0.01 μm or larger, more suitably 0.05 μm or larger, still more suitably 0.1 μm or larger, and suitably 1.5 μm or smaller, more suitably 1 μm or smaller, still more suitably 0.8 μm or smaller, still more suitably 0.5 μm or smaller, still more suitably 0.4 μm or smaller, still more suitably 0.3 μm or smaller.

<61> The method, according to any one of <1> to <60>, for producing the inorganic oxide in the form of the thin film, wherein the average thickness of the inorganic oxide in the form of the thin film is suitably 0.01 μm or larger and 1.5 μm or smaller, more suitably 0.05 μm or larger and 1 μm or smaller, still more suitably 0.1 μm or larger and 0.8 μm or smaller, still further more suitably 0.1 μm or larger and 0.5 μm or smaller, still further more suitably 0.1 μm or larger and 0.4 μm or smaller, still further more suitably 0.1 μm or larger and 0.3 μm or smaller.

<62> The method, according to any one of <1> to <61>, for producing the inorganic oxide in the form of the thin film, wherein the ratio of the average longitudinal diameter of the inorganic oxide in the form of the film to the average thickness thereof is suitably 5 or more, more suitably 30 or more, still more suitably 50 or more, and suitably 2000 or less, more suitably 800 or less, still more suitably 500 or less.

<63> The method, according to any one of <1> to <62>, for producing the inorganic oxide in the form of the thin film, wherein the ratio of the average longitudinal diameter of the inorganic oxide in the form of the film to the average thickness thereof is suitably 5 or more and 2000 or less, more suitably 30 or more and 800 or less, still more suitably 50 or more and 500 or less.

EXAMPLES

First Example (System for Producing Inorganic Oxide Gel in Form of Thin Film)

Figure 10:
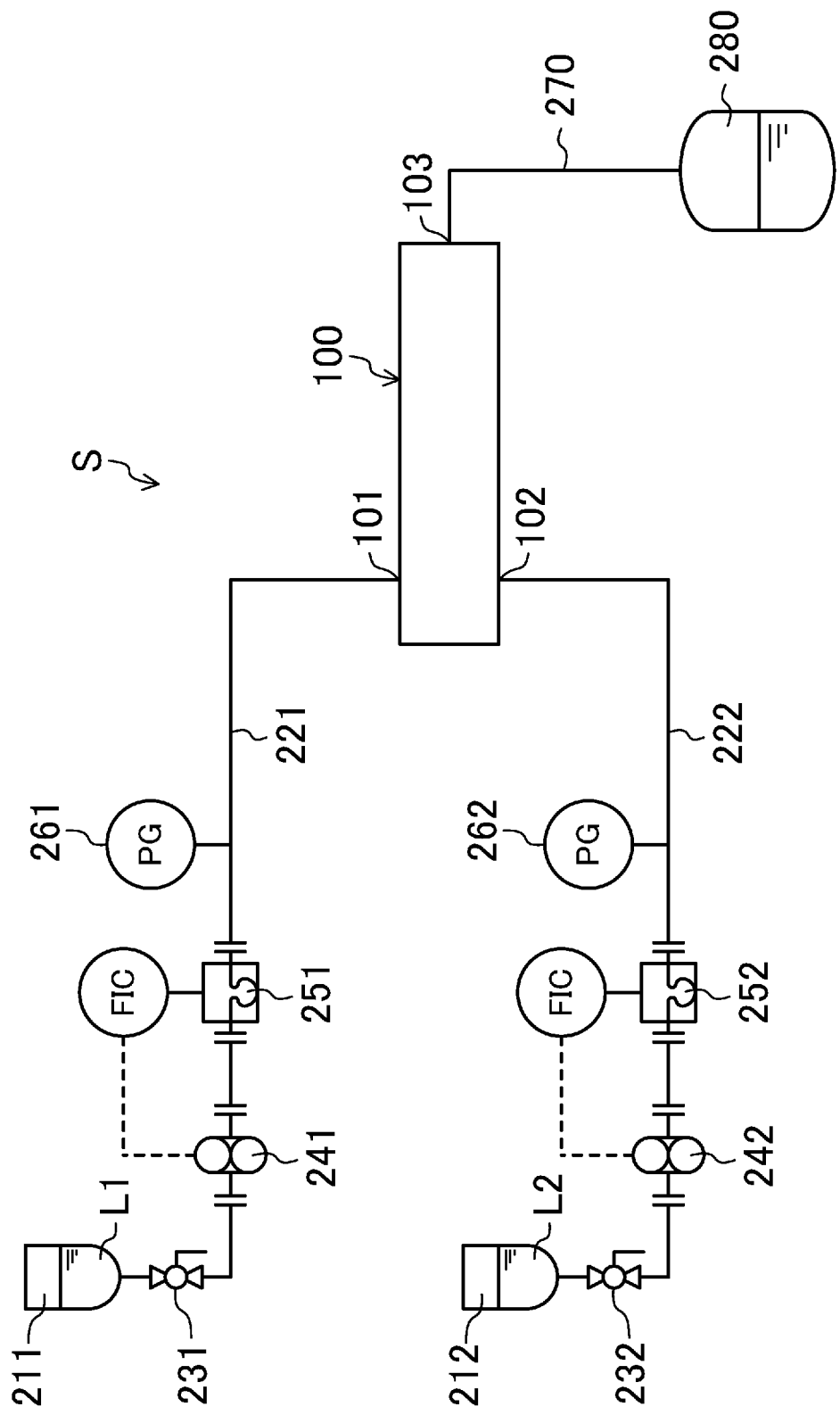
FIG. 10 is a diagram illustrating a configuration of a system for producing an inorganic oxide gel in the form of a thin film.
Figure 11A:
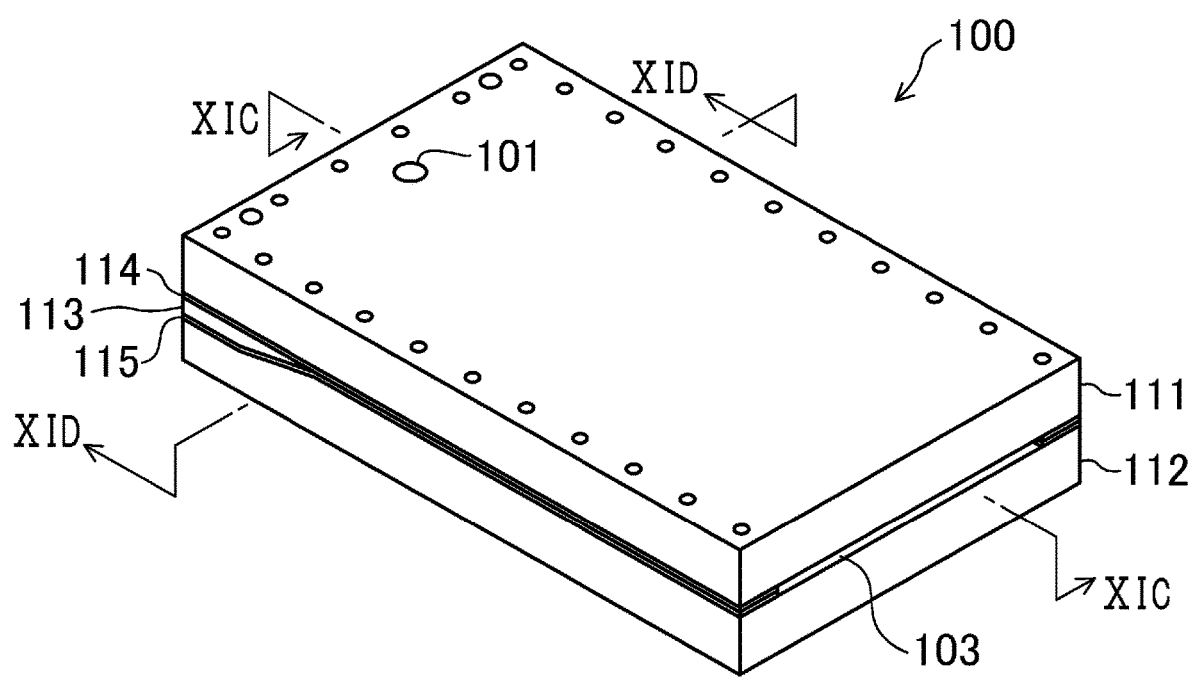
FIG. 11A is a perspective view of a substrate-laminated micromixer.
Figure 11B:
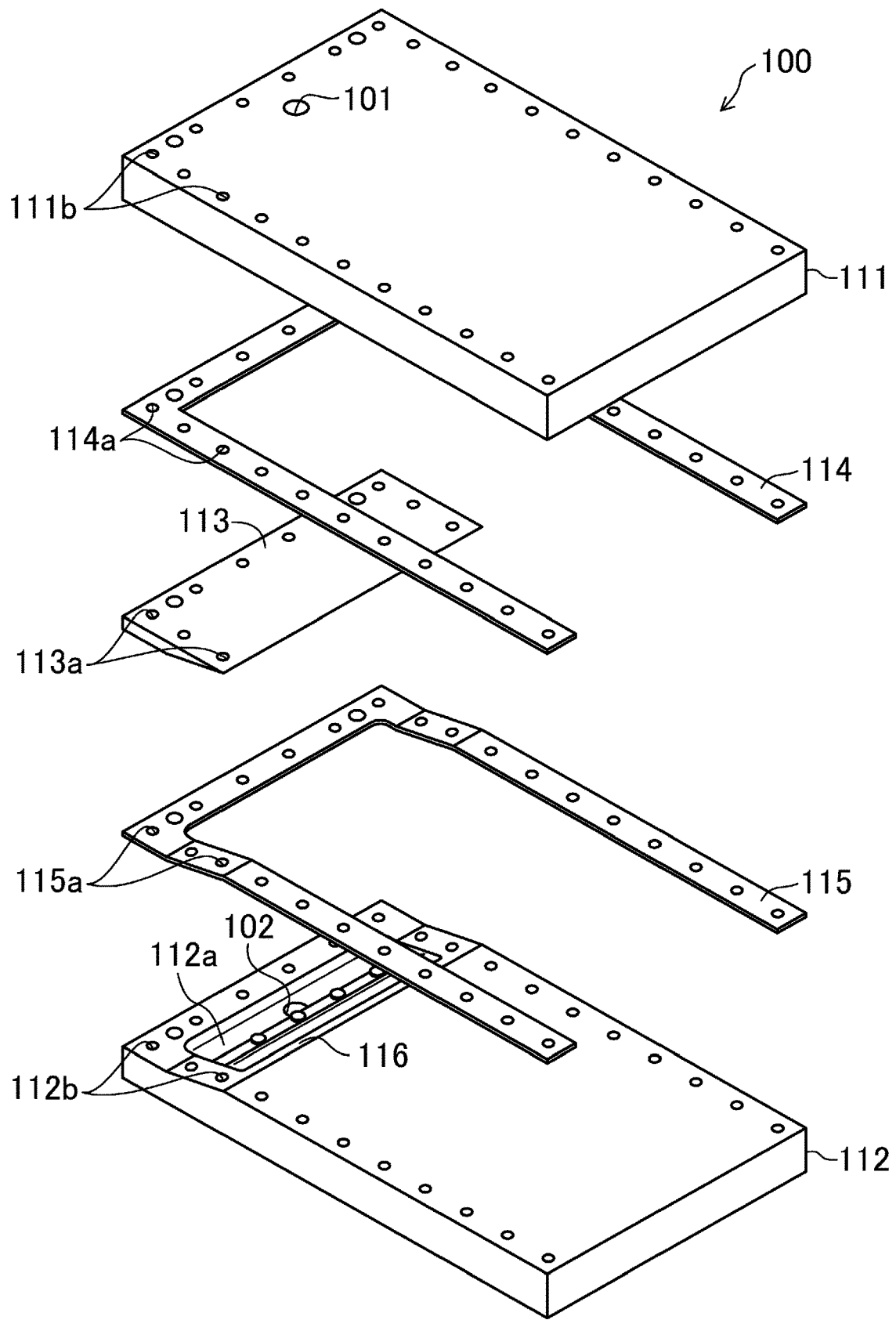
FIG. 11B is an exploded perspective view of the substrate-laminated micromixer.
Figure 11D:
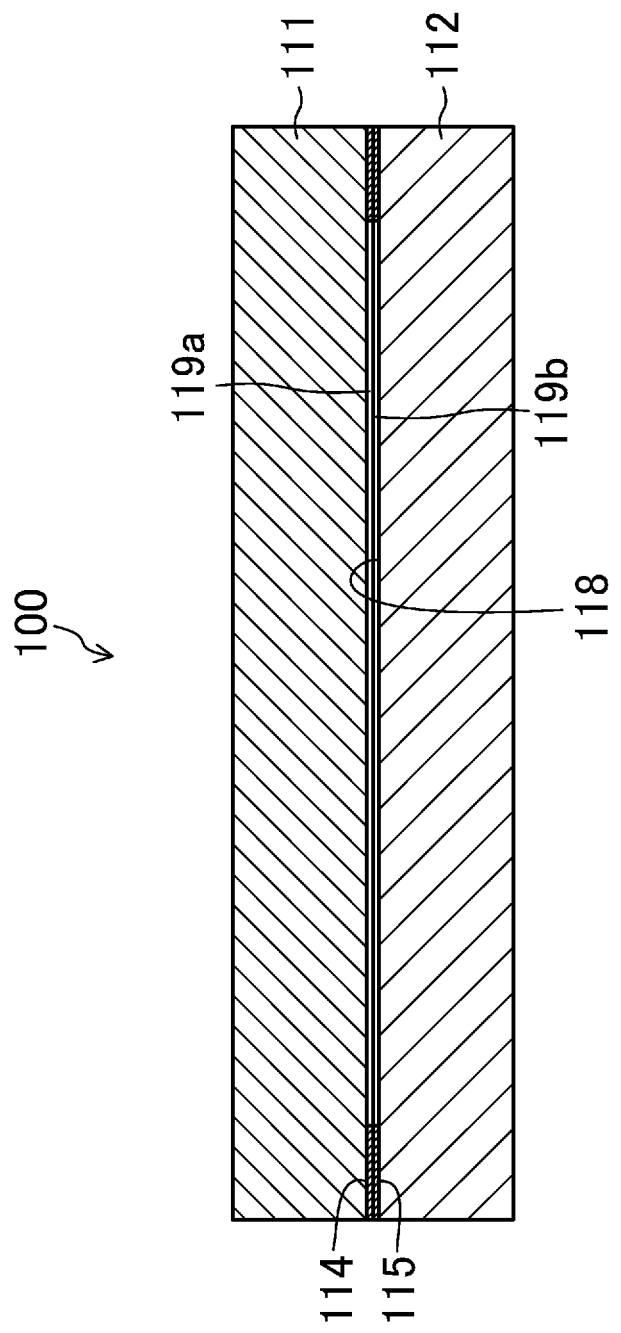
FIG. 11D is a cross-sectional view taken along a line XID-XID in FIG. 11A.

FIG. 10 is a diagram illustrating a system S for producing an inorganic oxide gel in the form of a thin film, the system being used in First Example.

The system S for producing the inorganic oxide gel in the form of the thin film includes a microreactor 100. The microreactor 100 includes a first liquid inlet 101 and a second liquid inlet 102 on the upstream side, and a liquid outlet 103 on the downstream side.

The first liquid inlet 101 of the microreactor 100 is connected to a first liquid supply pipe 221 extending from a first storage tank 211 for storing a first liquid L1. Likewise, the second liquid inlet 102 is connected to a second liquid supply pipe 222 extending from a second storage tank 212 for storing a second liquid L2. In the first liquid supply pipe 221 and the second liquid supply pipe 222, cocks 231 and 232 for switching between circulation and interception of the liquids, pumps 241 and 242 for sending the liquids, and flowmeters 251 and 252 for detecting the flow rates of the liquids are respectively provided in series in this order from the upstream side at some midpoints. Furthermore, pressure gauges 261 and 262 for detecting the pressures of the liquids are installed downstream from the flowmeters 251 and 252, respectively. The pumps 241 and 242 are electrically connected to the flowmeters 251 and 252, respectively, so as to perform the feedback control of the flow rates of the liquids. A slurry collecting pipe 270 extends from the liquid outlet 103 of the microreactor 100 and is connected to a slurry collecting tank 280.

FIGS. 11A to 11E are diagrams illustrating a substrate-laminated micromixer 100.

This substrate-laminated micromixer 100 is configured such that an upper substrate 111, a lower substrate 112, an intermediate substrate 113, an upper spacer 114, and a lower spacer 115 are integrally laminated.

The upper substrate 111 is formed in the shape of a rectangular plate, and one end of the long side is configured as an upstream portion while the other end is configured as a downstream portion. In the upstream portion of the upper substrate 111, the first liquid inlet 101 is formed so as to penetrate the upper substrate 111 in the thickness direction at an intermediate portion in the width direction. On the lower face side of the upstream portion of the upper substrate 111, a first liquid storage recess 111a extending along the width direction is provided so as to communicate with the first liquid inlet 101. At each of edges on both long sides and the upstream short side of the upper substrate 111, a plurality of positioning holes 111a penetrating the upper substrate 111 in the thickness direction is provided so as to be spaced out.

As is the case of the upper substrate 111, the lower substrate 112 is formed in the shape of a rectangular plate, and one end of the long side is configured as an upstream portion while the other end is configured as a downstream portion. The upstream portion of the lower substrate 112 is chipped away on the upper face side, and a slope portion 116 continuous to the edge on the upstream short side of the lower substrate 112, the edge being formed so as to have a smaller substrate-thickness, is provided so that the substrate thickness is gradually larger toward the downstream side. In the upstream portion of the lower substrate 112, the second liquid inlet 102 is formed so as to penetrate the lower substrate 112 in the thickness direction at an intermediate portion in the width direction. On the upper face side of the upstream portion of the lower substrate 112, a second liquid storage recess 112a including a part of the edge and a part of the slope portion 116 and extending along the width direction is provided so as to communicate with the second liquid inlet 102. At each of edges on both long sides and the upstream short side in the upper face of the lower substrate 112, a plurality of positioning holes 112b corresponding to the respective positioning holes 111b of the upper substrate 111 is provided so as to be spaced out.

The intermediate substrate 113 is formed in the shape of a wedge so as to correspond to the chipped portion of the lower substrate 112. At each of edges on both sides and the upstream side of the intermediate substrate 113, a plurality of positioning holes 113a corresponding to the respective positioning holes 111b of the upper substrate 111 and penetrating the intermediate substrate 113 in the thickness direction is provided so as to be spaced out.

The upper spacer 114 is formed in a thin and narrow band shape corresponding to the edges on both long sides and the upstream short side in the lower face of the upper substrate 111. The lower spacer 115 is formed in a thin and narrow bent band shape corresponding to the edges on both long sides and the upstream short side in the upper face of the lower substrate 112. In the upper spacer 114 and the lower spacer 115, a plurality of positioning holes 114a and 115a corresponding to the respective positioning holes 111b of the upper substrate 111 and penetrating the respective spacers in the thickness direction is respectively provided so as to be spaced out.

In the substrate-laminated micromixer 100, the lower spacer 115 is laminated on the lower substrate 112, and the intermediate substrate 113 is laminated on an upstream portion of the lower spacer 115. On the intermediate substrate 113 on the upstream side and a portion of the lower spacer 115 downstream from the intermediate substrate 113, the upper spacer 114 is laminated. On the upper spacer 114, the upper substrate 111 is laminated. Each of the positioning holes 111b of the upper substrate 111 is aligned with corresponding ones of positioning holes 114a, 113a, 115a, and 112b of the upper spacer 114, the intermediate substrate 113, the lower spacer 115, and the lower substrate 112. A pin, not illustrated, is inserted for fitting into each set of the positioning holes, whereby the components are integrated.

The substrate-laminated micromixer 100 is configured such that, a first liquid passage 117a equivalent to the thickness of the upper spacer 114 is provided between the lower face of the upper substrate 111 and the upper face of the intermediate substrate 113 so as to communicate with the first liquid storage recess 111a. A second liquid passage 117b equivalent to the thickness of the lower spacer 115 is provided between the upper face of the slope portion 116 of the lower substrate 112 and the lower face of the intermediate substrate 113 so as to communicate with the second liquid storage recess 112a. In a portion downstream from the intermediate substrate 113, a liquid contact portion 118 equivalent to the total of the thickness of the upper spacer 114 and the thickness of the lower spacer 115 is provided. A slit-shaped opening at a downstream end that is continuous to the liquid contact portion 118 is configured as the liquid outlet 103. At the downstream end of the intermediate substrate 113, a first slit 119a at which the first liquid passage 117a is opened into the liquid contact portion 118 and a second slit 119b at which the second liquid passage 117b is opened into the liquid contact portion 118 are provided in parallel.

In the substrate-laminated microreactor 100, the first liquid L1 flowing through the first liquid passage 117a is allowed to flow out of the first slit 119a, and, at the liquid contact portion 118, is brought into contact with the second liquid L2 flowing through the second liquid passage 117b and allowed to flow out of the second slit 119b. At this time, the second liquid L2 comes into contact with the first liquid L1 from behind at an angle with respect to the flow direction of the first liquid L1, and then, the liquids flow in the flow direction of the first liquid L1. The duration of contact during which the first liquid L1 and the second liquid L2 stayed in the liquid contact portion 118 is equivalent to the duration of reaction between the liquids.

In the substrate-laminated microreactor 100, the width $\delta_1$ of opening into the confluence portion in a direction perpendicular to the flow direction of the first liquid L1 in the first slit 119a from which the first liquid L1 flows out was 130 μm. The width 62 of opening into the confluence portion in a direction perpendicular to the flow direction of the second liquid L2 in the second slit 119b from which the second liquid L2 flows out was 130 μm. The angle of inclination of the slope portion 116 of the lower substrate 112, that is, an angle θ which the flow direction of the first liquid L1 forms with the flow direction of the second liquid L2, was 10°.

(Production of Titanium Oxide in Form of Thin Film)

Using the system S for producing an inorganic oxide gel in the form of a thin film, the system S including the above-mentioned substrate-laminated microreactor 100, the first liquid L1 and the second liquid L2 were brought into contact with each other by continuous operation to produce a titanium oxide in the form of a thin film in the following Example 1. Using a Wilhelmy type interfacial tensiometer, the interfacial tension of the first liquid L1 to the second liquid L2 at 25° C. was measured. Furthermore, the average of the maximum diameters of 500 data points measured by microscopic observation of the obtained titanium oxide in the form of the thin film was determined as an average longitudinal diameter. The average thickness of the cross-sections of 20 pieces obtained by cutting the obtained titanium oxide in the form of the film and measured by microscopic observation was determined as an average thickness. From these results, the ratio of the average longitudinal diameter to the average thickness was determined. Table 1 shows the results.

Example 1

As the first liquid L1, a hexane solution containing 8.0% by mass of Ti(OBu)$_4$ serving as an inorganic oxide precursor was prepared. Furthermore, as the second liquid L2, an ionic liquid solution containing 10% by mass of water serving as an inorganic-oxide-forming substance and having Emim cations and ES anions was prepared.

The first liquid L1 and the second liquid L2 were fed into the first storage tank 211 and the second storage tank 212, respectively, and these liquids were supplied to the substrate-laminated microreactor 100 to obtain a slurry containing a titanium oxide gel in the form of a thin film. At this time, the flow rate $Q_1$ of the first liquid L1 was 39 mL/min, the linear velocity $u_1$ of the first liquid L1 at the time of contact between the first liquid L1 and the second liquid L2 was 0.05 m/s, and the Reynolds number $Re_1$ of the first liquid L1 until the time when the first liquid L1 and the second liquid L2 came into contact with each other was 14. The flow rate $Q_2$ of the second liquid L2 was 39 mL/min, the linear velocity in of the second liquid L2 at the time of contact between the first liquid L1 and the second liquid L2 was 0.05 m/s, and the Reynolds number $Re_2$ of the second liquid L2 until the time when the first liquid L1 and the second liquid L2 came into contact with each other was 0.14. The temperature (reaction temperature) of the first liquid L1 and the second liquid L2 was 25° C. The duration of contact (duration of reaction) between the first liquid L1 and the second liquid L2 at a liquid contact portion was 3 seconds. An angle that the flow direction of the first liquid L1 formed with the flow direction of the second liquid L2 was 10°.

The obtained slurry was filtered using a metal mesh, and the titanium oxide gel in the form of the thin film remaining on the metal mesh was washed with ethanol, and subsequently dried and baked to obtain a solid titanium oxide in the form of a thin film.

TABLE 1

| | First Example | Example 1 |
|---|---|---|
| First Liquid | Solvent | Hexane |
| | Inorganic Oxide Precursor | Ti(OBu)$_4$ |
| | Inorganic Oxide Precursor Content $c_1$ (% by mass) | 8.0 |
| | Flow Rate $Q_1$ (mL/min) | 39 |
| | Linear Velocity $u_1$ (m/s) | 0.05 |
| | Reynolds Number $Re_1$ | 14 |
| Second Liquid | Solvent | EmimES |
| | Inorganic-oxide-forming Substance | Water |
| | Inorganic-oxide-forming Substance Content $c_2$ (% by mass) | 10 |
| | Flow Rate $Q_2$ (mL/min) | 39 |
| | Linear Velocity $u_2$ (m/s) | 0.05 |
| | Reynolds Number $Re_2$ | 0.14 |
| Interfacial Tension of First Liquid to Second Liquid (mN/m) | | 15.1 |
| $m_2/m_1$ (Molar Movement Rate Ratio) | | 45 |
| $u_1/u_2$ | | 1.0 |
| $Re_1/Re_2$ | | 100 |
| Reactor | | Substrate-laminated Microreactor FIGS. 11A to 11E |
| Reaction Temperature (C. °) | | 25 |
| Contact Duration (Reaction Duration) (s) | | 3 |
| Metal Oxide Form | | Thin Film Form |
| Average Longitudinal Diameter (μm) | | 32 |
| Average Thickness (μm) | | 0.35 |
| Average Longitudinal Diameter/ Average Thickness | | 91 |

Second Example (System for Producing Inorganic Oxide Gel in Form of Thin Film)

Figure 12A:
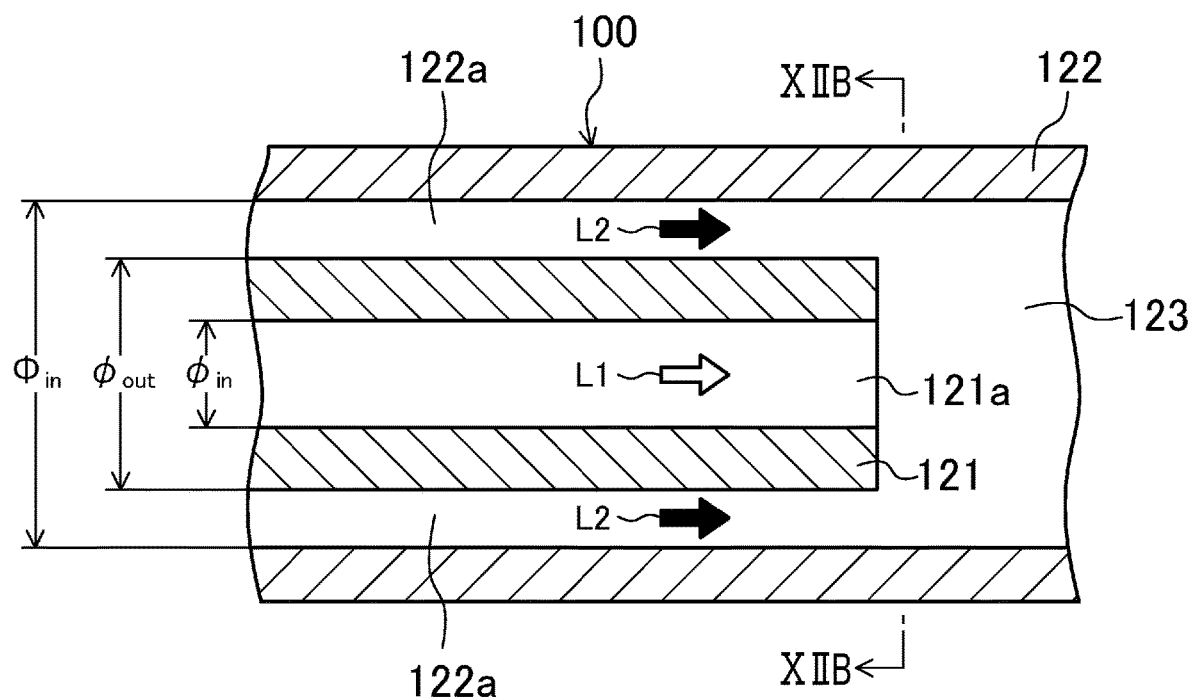
FIG. 12A is a longitudinal cross-sectional view of a principal portion of a double pipe microreactor.
Figure 12B:
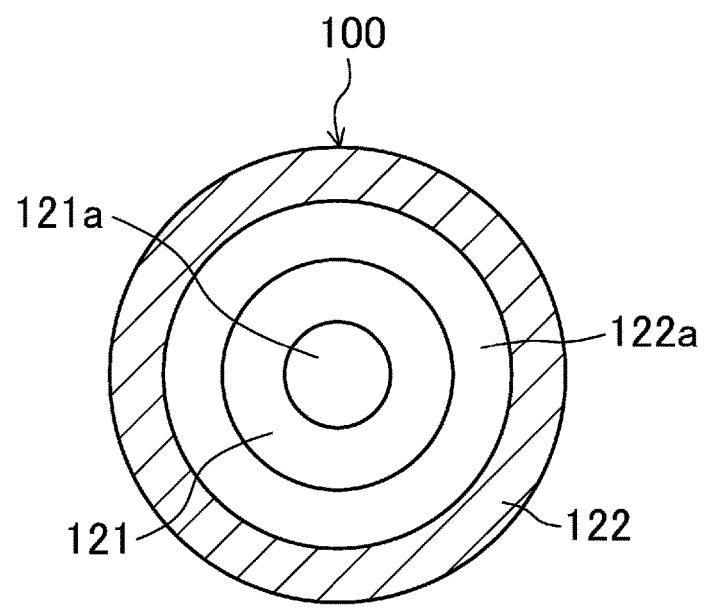

FIGS. 12A and 12B are diagrams illustrating a microreactor 100 of a system S for producing an inorganic oxide gel in the form of a thin film, the system S being used in Second Example. Note that configurations, except the microreactor 100, are the same as those of the system S, used in First Example, for producing the inorganic oxide gel in the form of the thin film.

This double pipe microreactor 100 includes an inner pipe 121 having a smaller diameter, and an outer pipe 122 having a larger diameter and coaxially provided to cover the inner piper 121. An end of the inner pipe 121 is positioned in an intermediate portion of the outer pipe 122. A first liquid passage 121a is provided inside the inner pipe 121 and a second liquid passage 122a is provided between the inner pipe 121 and the outer pipe 122, and furthermore, a liquid contact portion 123 is provided at the downstream end of the inner pipe 121. A first inlet 101 and a second inlet 102 that are provided on the upstream side of the microreactor 100 communicate with the first liquid passage 121a and the second liquid passage 122a, respectively. A liquid outlet 103 provided on the downstream side of the microreactor 100 is configured with an opening continuous to the liquid contact portion 123.

In this double pipe microreactor 100, the first liquid L1 flowing through the first liquid passage 121a in the inner pipe 121 is allowed to flow out of an end of the inner pipe 121, and at the liquid contact portion 123, the first liquid L1 is brought into contact with the second liquid L2 having flowed through the second liquid passage 122a between the inner pipe 121 and the outer pipe 122. At this time, both of the first liquid L1 and the second liquid L2 flow in the same direction, and come into contact with each other while maintaining the flow direction. Furthermore, the first liquid L1 comes into contact with the second liquid L2 so as to be covered with the second liquid L2. The duration of contact during which the first liquid L1 and the second liquid L2 stay in the liquid contact portion 123 is equivalent to the duration of reaction between the liquids.

In the double pipe microreactor 100, the inner diameter $\varphi_{in}$ of the inner pipe 121 from which the first liquid L1 flows out, that is, the diameter of opening into the confluence portion in a direction perpendicular to the flow direction of the first liquid L1 was 170 μm. Half of the difference between the outer diameter $\varphi_{out}$ of the inner pipe 121 and the inner diameter $\Phi_{in}$ of the outer pipe 122 constituting the second liquid passage 122a through which the second liquid L2 having flowed, that is, the clearance of opening into the confluence portion in a direction perpendicular to the flow direction of the second liquid L2 was 400 μm.

(Production of Metal Oxide in Form of Thin Film)

Using a system S for producing an inorganic oxide gel in the form of a thin film, the system S including the double pipe microreactor 100, a first liquid L1 and a second liquid L2 were brought into contact with each other by continuous operation to produce a metal oxide in the form of a thin film in each of the following Examples 2-1 to 2-8. In each of Examples 2-1 to 2-8, the interfacial tension of the first liquid L1 to the second liquid L2 at 25° C. was measured using a Wilhelmy type interfacial tensiometer. Furthermore, the average longitudinal diameter and the average thickness of the inorganic oxide in the form of the thin film obtained in each of Examples 2-1 to 2-2 and 2-5 to 2-7 were determined in the same manner as in First Example, and furthermore the ratio of the average longitudinal diameter to the average thickness was calculated. As for the inorganic oxide in the form of the thin film obtained in Examples 2-2, only the average thickness thereof was determined. Table 2 shows the results.

Example 2-1

As the first liquid L1, a hexane solution containing 20% by mass of Ti(OBu)$_4$ serving as an inorganic oxide precursor was prepared. Furthermore, as the second liquid L2, an ionic liquid solution containing 1.0% by mass of water serving as an inorganic-oxide-forming substance and having Bmim cations and NTf2 anions was prepared.

The first liquid L1 and the second liquid L2 were fed into the first storage tank 211 and the second storage tank 212, respectively, and these liquids were supplied to the double pipe microreactor 100 to obtain a slurry containing a titanium oxide gel in the form of a thin film. At this time, the flow rate $Q_1$ of the first liquid L1 was 0.14 mL/min, the linear velocity $u_1$ of the first liquid L1 at the time of contact between the first liquid L1 and the second liquid L2 was 0.11 m/s, and the Reynolds number $Re_1$ of the first liquid L1 until the time when the first liquid L1 and the second liquid L2 came into contact with each other was 42. The flow rate $Q_2$ of the second liquid L2 was 10.4 mL/min, the linear velocity $u_2$ of the second liquid L2 at the time of contact between the first liquid L1 and the second liquid L2 was 0.07 m/s, and the Reynolds number $Re_2$ of the second liquid L2 until the time when the first liquid L1 and the second liquid L2 came into contact with each other was 2. The temperature (reaction temperature) of the first liquid L1 and the second liquid L2 was 25° C. The duration of contact (duration of reaction) between the first liquid L1 and the second liquid L2 at a liquid contact portion was 3 seconds.

The obtained slurry was filtered using a metal mesh, and the titanium oxide gel in the form of the thin film remaining on the metal mesh was washed with ethanol, and subsequently dried and baked to obtain a solid titanium oxide in the form of a thin film.

Example 2-2

A solid titanium oxide in the form of a thin film was obtained in the same manner as in Example 2-1, except that, as the first liquid L1, a toluene solution containing 30% by mass of Ti(OBu)$_4$ serving as an inorganic oxide precursor was used.

Example 2-3

A solid titanium oxide in the form of a thin film was obtained in the same manner as in Example 2-1, except that, as the second liquid L2, an ionic liquid solution containing 1.0% by mass of water serving as an inorganic-oxide-forming substance and having Emim cations and DCA anions was used.

Example 2-4

A solid titanium oxide in the form of a thin film was obtained in the same manner as in Example 2-1, except that, as the second liquid L2, an ionic liquid solution containing 0.1% by mass of water serving as an inorganic-oxide-forming substance and having Bmim cations and NTf2 anions was used.

Example 2-5

A solid titanium oxide in the form of a thin film was obtained in the same manner as in Example 2-2, except that the flow rate $Q_1$ of the first liquid L1 was 0.48 mL/min, the linear velocity $u_1$ of the first liquid L1 at the time of contact between the first liquid L1 and the second liquid L2 was 0.35 m/s, and the Reynolds number $Re_1$ of the first liquid L1 until the time when the first liquid L1 and the second liquid L2 came into contact with each other was 87, and furthermore, the flow rate $Q_2$ of the second liquid L2 was 34.7 mL/min, the linear velocity $u_2$ of the second liquid L2 at the time of contact between the first liquid L1 and the second liquid L2 was 0.2 m/s, and the Reynolds number $Re_2$ of the second liquid L2 until the time when the first liquid L1 and the second liquid L2 came into contact with each other was 5.

Example 2-6

A solid titanium oxide in the form of a thin film was obtained in the same manner as in Example 2-1, except that the flow rate $Q_1$ of the first liquid L1 was 5.2 mL/min, the linear velocity $u_1$ of the first liquid L1 at the time of contact between the first liquid L1 and the second liquid L2 was 3.8 m/s, and the Reynolds number $Re_1$ of the first liquid L1 until the time when the first liquid L1 and the second liquid L2 came into contact with each other was 1439, and furthermore, as the second liquid L2, an ionic liquid solution containing 1.2% by mass of water serving as an inorganic-oxide-forming substance and having Emim cations and ES anions was used.

Example 2-7

A solid zirconium oxide in the form of a thin film was obtained in the same manner as in Example 2-1, except that, as the first liquid L1, a hexane solution containing 30% by mass of $Zr(OBu)_4$ serving as an inorganic oxide precursor was used, and furthermore, as the second liquid L2, an ionic liquid solution containing 0.9% by mass of water serving as an inorganic-oxide-forming substance and having Bmim cations and NTf2 anions was used.

Example 2-8

A titanium oxide in the form of a partially thin film was obtained in the same manner as in Example 2-2, except that, in the double pipe microreactor 100, the inner diameter $\varphi_{in}$ of the inner pipe 121 from which the first liquid L1 flowed out was changed to 750 μm.

TABLE 2

| Second Example | | 2-1 | 2-2 | 2-3 | 2-4 | 2-5 | 2-6 | 2-7 | 2-8 |
|---|---|---|---|---|---|---|---|---|---|
| First Liquid | Solvent | Hexane | Toluene | Hexane | Toluene | Toluene | Hexane | Hexane | Toluene |
| | Inorganic Oxide Precursor | Ti(OBu)4 | Ti(OBu)4 | Ti(OBu)4 | Ti(OBu)4 | Ti(OBu)4 | Ti(OBu)4 | Zr(OBu)4 | Ti(OBu)4 |
| | Inorganic Oxide Precursor Content $c_1$ (% by mass) | 20 | 30 | 20 | 30 | 30 | 20 | 30 | 30 |
| | Flow Rate $Q_1$ (mL/min) | 0.14 | 0.14 | 0.14 | 0.14 | 0.48 | 5.2 | 0.14 | 0.14 |
| | Linear Velocity $u_1$ (m/s) | 0.11 | 0.11 | 0.11 | 0.11 | 0.35 | 3.8 | 0.11 | 0.006 |
| | Reynolds Number $Re_1$ | 42 | 27 | 42 | 27 | 87 | 1439 | 42 | 7 |
| Second Liquid | Solvent | BmimNTf2 | BmimNTf2 | EmimDCA | BmimNTf2 | BmimNTf2 | EmimES | BmimNTf2 | BmimNTf2 |
| | Inorganic-oxide-forming Substance | Water | Water | Water | Water | Water | Water | Water | Water |
| | Inorganic-oxide-forming Substance Content $c_2$ (% by mass) | 1.0 | 1.0 | 1.0 | 0.1 | 1.0 | 1.2 | 0.9 | 1.0 |
| | Flow Rate $Q_2$ (mL/min) | 10.4 | 10.4 | 10.4 | 10.4 | 34.7 | 10.4 | 10.4 | 10.4 |
| | Linear Velocity $u_2$ (m/s) | 0.07 | 0.07 | 0.07 | 0.07 | 0.2 | 0.07 | 0.07 | 0.07 |
| | Reynolds Number $Re_2$ | 2 | 2 | 8.77 | 2 | 5 | 2 | 2 | 2 |
| Interfacial Tension of First Liquid to Second Liquid (mN/m) | | 8.8 | 1.2 | 22.1 | 1.2 | 1.2 | 15.1 | 8.8 | 1.2 |
| $m_2/m_1$ (Molar Movement Rate Ratio) | | 147 | 76 | 20 | 7.6 | 76 | 4 | 76 | 30 |

TABLE 2-continued

| Second Example | Example | | | | | | | |
|---|---|---|---|---|---|---|---|---|
| | 2-1 | 2-2 | 2-3 | 2-4 | 2-5 | 2-6 | 2-7 | 2-8 |
| $u_1/u_2$ | 1.6 | 1.6 | 1.6 | 1.6 | 1.8 | 54 | 1.6 | 0.085 |
| $Re_1/Re_2$ | 21 | 14 | 4.8 | 14 | 17 | 720 | 21 | 3.5 |
| Reactor | Double Pipe Microreactor FIGS. 12A to 12B | Double Pipe Microreactor FIGS. 12A to 12B | Double Pipe Microreactor FIGS. 12A to 12B | Double Pipe Microreactor FIGS. 12A to 12B | Double Pipe Microreactor FIGS. 12A to 12B | Double Pipe Microreactor FIGS. 12A to 12B | Double Pipe Microreactor FIGS. 12A to 12B | Double Pipe Microreactor FIGS. 12A to 12B |
| Reaction Temperature (° C.) | 25 | 25 | 25 | 25 | 25 | 25 | 25 | 25 |
| Contact Duration (Reaction Duration) (s) | 3 | 3 | 3 | 3 | 3 | 3 | 3 | 3 |
| Metal Oxide Form | Thin Film Form | Thin Film Form | Thin Film Form | Thin Film Form | Thin Film Form | Thin Film Form | Thin Film Form | Partially Thin-Film Form |
| Average Longitudinal Diameter (μm) | 10 | 41 | not measured | not measured | 39 | 30 | 38 | not measured |
| Average Thickness (μm) | 0.15 | 0.38 | 0.75 | not measured | 0.31 | 0.47 | 0.11 | not measured |
| Average Longitudinal Diameter/Average Thickness | 67 | 108 | — | — | 126 | 64 | 345 | — |

Third Example

Using a T-shaped pipe having an inner diameter of 2.4 mm, the first liquid L1 and the second liquid L2 were brought into contact with each other by continuous operation to produce a titanium oxide in the form of a thin film in the following Example 3. Using a Wilhelmy type interfacial tensiometer, the interfacial tension of the first liquid L1 to the second liquid L2 at 25° C. was measured. Furthermore, the average longitudinal diameter and the average thickness of the obtained inorganic oxide in the form of the thin film were determined in the same manner as in First Example, and the ratio of the average longitudinal diameter to the average thickness was calculated. Table 3 shows the results.

Example 3

As the first liquid L1, a toluene solution containing 30% by mass of Ti(OBu)$_4$ serving as an inorganic oxide precursor was prepared. Furthermore, as the second liquid L2, an ionic liquid solution containing 1% by mass of water serving as an inorganic-oxide-forming substance and having Bmim cations and NTf2 anions was prepared.

From one end of a straight pipe portion of the T-shaped pipe, the first liquid L1 was allowed to flow into the pipe, and the second liquid L2 was allowed to flow into a branch pipe portion of the T-shaped pipe, whereby the liquids joined together at a liquid contact portion downstream from the intersection of the direct pipe portion and the branch pipe portion, and then, the joined fluid was collected at the other end of the straight pipe portion. At this time, the flow rate $Q_1$ of the first liquid L1 was 0.14 mL/min, the linear velocity $u_1$ of the first liquid L1 at the time of contact between the first liquid L1 and the second liquid L2 was 0.0005 m/s, and the Reynolds number $Re_1$ of the first liquid L1 until the time when the first liquid L1 and the second liquid L2 came into contact with each other was 1882. The flow rate $Q_2$ of the second liquid L2 was 10.4 mL/min, the linear velocity $u_2$ of the second liquid L2 at the time of contact between the first liquid L1 and the second liquid L2 was 0.038 m/s, and the Reynolds number $Re_2$ of the second liquid L2 until the time when the first liquid L1 and the second liquid L2 came into contact with each other was 2.65. The temperature (reaction temperature) of the first liquid L1 and the second liquid L2 was 25° C. An angle that the flow direction of the first liquid L1 formed with the flow direction of the second liquid L2 at the joining point was 90°.

TABLE 3

| Third Example | | Example 3 |
|---|---|---|
| First Liquid | Solvent | Toluene |
| | Inorganic Oxide Precursor | Ti(OBu)$_4$ |
| | Inorganic Oxide Precursor Content $c_1$ (% by mass) | 30 |
| | Flow Rate $Q_1$ (mL/min) | 0.14 |
| | Linear Velocity $u_1$ (m/s) | 0.0005 |
| | Reynolds Number $Re_1$ | 1882 |
| Second Liquid | Solvent | BmimNTf2 |
| | Inorganic-oxide-forming Substance | Water |
| | Inorganic-oxide-forming Substance Content $c_2$ (% by mass) | 1 |
| | Flow Rate $Q_2$ (mL/min) | 10.4 |
| | Linear Velocity $u_2$ (m/s) | 0.038 |
| | Reynolds Number $Re_2$ | 2.65 |
| Interfacial Tension of First Liquid to Second Liquid (mN/m) | | 15.1 |
| $m_2/m_1$ (Molar Movement Rate Ratio) | | 76 |
| $u_1/u_2$ | | 0.014 |
| $Re_1/Re_2$ | | 710 |
| Reactor | | T-shaped pipe Microreactor |
| Reaction Temperature (° C.) | | 25 |
| Contact Duration (Reaction Duration) (s) | | 3 |
| Metal Oxide Form | | Thin Film Form |
| Average Longitudinal Diameter (μm) | | 28 |
| Average Thickness (μm) | | 0.17 |
| Average Longitudinal Diameter/Average Thickness | | 165 |

Fourth Example

Figure 13:
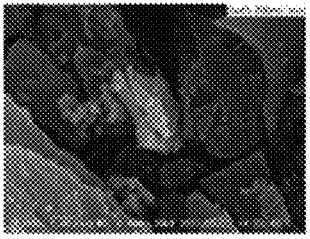
FIG. 13 (Table 5) shows the titanium oxides in the form of the thin film obtained in Examples 4-1, 4-2 and 4-3.
Figure 13:
Figure 13:
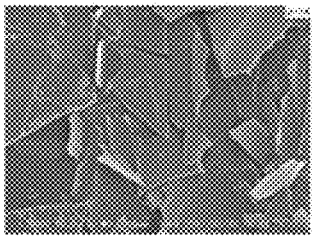

Using a liquid tank 30 illustrated in FIG. 3, the first liquid L1 and the second liquid L2 were brought into contact with each other by continuous operation to produce a titanium oxide in the form of a thin film in each of the following Examples 4-1 to 4-3. In each of Examples 4-1 to 4-3, the interfacial tension of the first liquid L1 to the second liquid L2 at 25° C. was measured using a Wilhelmy type interfacial tensiometer. Furthermore, the average thickness of the obtained titanium oxide in the form of the thin film was determined in the same manner as in First Example. Table 4 shows the results, and FIG. 13 (Table 5) shows the titanium oxides in the form of the thin film obtained in Examples 4-1, 4-2 and 4-3.

Example 4-1

As the first liquid L1, a hexane solution containing 5.0% by mass of $Ti(OBu)_4$ serving as an inorganic oxide precursor was prepared. Furthermore, as the second liquid L2, an ionic liquid solution containing 10% by mass of water serving as an inorganic-oxide-forming substance and having Emim cations and ES anions was prepared.

The second liquid L2 was allowed to flow while circulating in the liquid tank 30, and the first liquid L1 was supplied onto a surface of the second liquid L2 from a microsyringe, whereby a slurry containing a titanium oxide gel in the form of a thin film was obtained. At this time, the flow rate $Q_2$ of the second liquid L2 was 200 mL/min, the linear velocity $u_2$ of the second liquid L2 was 0.012 m/s, and the Reynolds number $Re_2$ of the second liquid L2 was 5.1. The flow rate $Q_1$ of the first liquid L1 was 0.66 mL/min. The temperature (reaction temperature) of the first liquid L1 and the second liquid L2 was 25° C. The duration of contact (duration of reaction) between the first liquid L1 and the second liquid L2 was 13 seconds.

The obtained slurry was filtered using a metal mesh, and the titanium oxide gel in the form of the thin film remaining on the metal mesh was washed with ethanol, and subsequently dried and baked to obtain a solid titanium oxide in the form of a thin film.

Example 4-2

A solid titanium oxide in the form of a thin film was obtained in the same manner as in Example 4-1, except that, as the first liquid L1, a hexane solution containing 30% by mass of $Ti(OBu)_4$ serving as an inorganic oxide precursor was used.

Example 4-3

A solid titanium oxide in the form of a thin film was obtained in the same manner as in Example 4-2, except that the flow rate $Q_2$ of the second liquid L2 was 300 mL/min, the linear velocity $u_2$ of the second liquid L2 was 0.016 m/s, and the Reynolds number $Re_2$ of the second liquid L2 was 7.6, and furthermore, the duration of contact (duration of reaction) between the first liquid L1 and the second liquid L2 was 9 seconds.

TABLE 4

| | Fourth Example | Example 4-1 | Example 4-2 | Example 4-3 |
|---|---|---|---|---|
| First Liquid | Solvent | Hexane | Hexane | Hexane |
| | Inorganic Oxide Precursor | $Ti(OBu)_4$ | $Ti(OBu)_4$ | $Ti(OBu)_4$ |
| | Inorganic Oxide Precursor Content $c_1$ (% by mass) | 5.0 | 30 | 30 |
| | Flow Rate $Q_1$ (mL/min) | 0.66 | 0.66 | 0.66 |
| Second Liquid | Solvent | EmimES | EmimES | EmimES |
| | Inorganic-oxide-forming Substance | Water | Water | Water |
| | Inorganic-oxide-forming Substance Content $c_2$ (% by mass) | 10 | 10 | 10 |
| | Flow Rate $Q_2$ (mL/min) | 200 | 200 | 300 |
| | Linear Velocity $u_2$ (m/s) | 0.012 | 0.012 | 0.016 |
| | Reynolds Number $Re_2$ | 5.1 | 5.1 | 7.6 |
| Interfacial Tension of First Liquid to Second Liquid (mN/m) | | 19.3 | 19.3 | 19.3 |
| $m_2/m_1$ (Molar Movement Rate Ratio) | | 20485 | 3035 | 4553 |
| Reactor | | Liquid Tank FIG. 3 | Liquid Tank FIG. 3 | Liquid Tank FIG. 3 |
| Reaction Temperature (° C.) | | 25 | 25 | 25 |
| Contact Duration (Reaction Duration) (s) | | 13 | 13 | 9 |
| Metal Oxide Form | | Thin Film Form | Thin Film Form | Thin Film Form |
| Average Thickness (μm) | | 0.29 | 0.40 | 0.45 |

Fifth Example

Figure 14:
FIG. 14 (Table 7) shows the obtained titanium oxide in Example 5.

Using the belt-conveyor system 60 as illustrated in FIG. 6 and FIGS. 7A and 7B, the first liquid L1 and the second liquid L2 were brought into contact with each other by continuous operation to produce a titanium oxide in the form of a thin film in the following Example 5. Using a Wilhelmy type interfacial tensiometer, the interfacial tension of the first liquid L1 to the second liquid L2 at 25° C. was measured. Furthermore, the average thickness of the obtained titanium oxide in the form of the thin film was determined in the same manner as in First Example. Table 6 shows the results, and FIG. 14 (Table 7) shows the obtained titanium oxide in Example 5.

Example 5

As the first liquid L1, a hexane solution containing 30% by mass of $Ti(OBu)_4$ serving as an inorganic oxide precursor was prepared. Furthermore, as the second liquid L2, an ionic liquid solution containing 10% by mass of water serving as an inorganic-oxide-forming substance and having Emim cations and ES anions was prepared.

The second liquid L2 was supplied into recesses 63 in a conveyor belt 62 moving while being wound around a pair of rollers 61, and transported, and the first liquid L1 was supplied onto the surface of the second liquid L2 to form a liquid laminated structure, whereby a slurry containing a titanium oxide gel in the form of a thin film was obtained. At this time, the transport rate $Q_2'$ of the second liquid L2 was 120 mL/min. The transport rate $Q_1'$ of the first liquid L1 was 0.06 mL/min. The temperature (reaction temperature) of the first liquid L1 and the second liquid L2 was 25° C. The duration of contact (duration of reaction) between the first liquid L1 and the second liquid L2 was 10 seconds.

The obtained slurry was filtered using a metal mesh, and the titanium oxide gel in the form of the thin film remaining on the metal mesh was washed with ethanol, and subsequently dried and baked to obtain a solid titanium oxide in the form of a thin film.

TABLE 6

| | Fifth Example | Example 5 |
|---|---|---|
| First Liquid | Solvent | Hexane |
| | Inorganic Oxide Precursor | Ti(OBu)$_4$ |
| | Inorganic Oxide Precursor Content $c_1$ (% by mass) | 30 |
| | Transport Rate $Q_1'$ (mL/min) | 0.06 |
| Second Liquid | Solvent | EmimES |
| | Inorganic-oxide-forming Substance | Water |
| | Inorganic-oxide-forming Substance Content $c_2$ (% by mass) | 10 |
| | Transport Rate $Q_2'$ (mL/min) | 120 |
| Interfacial Tension of First Liquid to Second Liquid (mN/m) | | 19.3 |
| $m_2/m_1$ (Molar Movement Rate Ratio) | | 20107 |
| Reactor | | Belt-conveyor System FIGS. 6, 7A to 7B |
| Reaction Temperature (° C.) | | 25 |
| Contact Duration (Reaction Duration) (s) | | 10 |
| Metal Oxide Form | | Thin Film Form |
| Average Thickness (μm) | | 0.47 |

Comparative Examples

The first liquid L1 and the second liquid L2 were brought into contact with each other by batch operation to produce titanium oxides of the following Comparative Examples 1 and 2. In each of Comparative Examples 1 and 2, the interfacial tension of the first liquid L1 to the second liquid L2 at 25° C. was measured using a Wilhelmy type interfacial tensiometer. Furthermore, methanol was used as the second liquid L2, and the first liquid L1 and the second liquid L2 were brought into contact to each other by the same continuous operation as in Second Example to produce a titanium oxide of the following Comparative Example 3. Tables 8 and 9 show the details.

Comparative Example 1

As the first liquid L1, a toluene solution containing 30% by mass of Ti(OBu)$_4$ serving as an inorganic oxide precursor was prepared. Furthermore, as the second liquid L2, an ionic liquid solution containing 0.2% by mass of water serving as an inorganic-oxide-forming substance and having Bmim cations and NTf2 anions was prepared.

The second liquid L2 prepared in a vessel was left standing, and subsequently, the first liquid L1 was added from above onto the second liquid L2 in the vessel, and the mixture was left standing for 10 minutes to cause an interface reaction, whereby a slurry containing a spherical titanium oxide gel was obtained. The temperature (reaction temperature) of the first liquid L1 and the second liquid L2 was 25° C.

The obtained slurry was filtered using a metal mesh, and the spherical titanium oxide gel remaining on the metal mesh was washed with ethanol, and subsequently dried and baked to obtain a solid spherical titanium oxide.

Comparative Example 2

A slurry containing a spherical titanium oxide gel was obtained by the same operation as in Comparative Example 1, except that, after the addition of the first liquid L1 to the second liquid L2, the mixture was stirred for 10 minutes.

The obtained slurry was filtered using a metal mesh, and the spherical titanium oxide gel remaining on the metal mesh was washed with ethanol, and subsequently dried and baked to obtain a solid spherical titanium oxide. In Comparative Example 2, although the reaction was accelerated by stirring, a titanium oxide in the form of a thin film was not obtained.

TABLE 8

| | | Comparative Example | |
|---|---|---|---|
| | Comparative Example | 1 | 2 |
| First Liquid | Solvent | Toluene | Toluene |
| | Inorganic Oxide Precursor | Ti(OBu)$_4$ | Ti(OBu)$_4$ |
| | Inorganic Oxide Precursor Content $c_1$ (% by mass) | 30 | 30 |
| Second Liquid | Solvent | BmimNTf2 | BmimNTf2 |
| | Inorganic-oxide-forming Substance | Water | Water |
| | Inorganic-oxide-forming Substance Content $c_2$ (% by mass) | 0.2 | 0.2 |
| Interfacial Tension of First Liquid to Second Liquid (mN/m) | | 1.2 | 1.2 |
| Inorganic-oxide-forming Substance/ Inorganic Oxide Precursor (molar ratio) | | 5 | 25 |
| Reaction Temperature (° C.) | | 25 | 25 |
| Reaction Duration (s) | | 600 | 600 |
| Metal Oxide Form | | Spherical Form | Spherical Form |

Comparative Example 3

As the first liquid L1, a hexane solution containing 20% by mass of Ti(OBu)$_4$ serving as an inorganic oxide precursor was prepared. Furthermore, as the second liquid L2, a methanol solution containing 1.8% by mass of water serving as an inorganic-oxide-forming substance was prepared.

The first liquid L1 and the second liquid L2 were fed into the first storage tank 211 and the second storage tank 212, respectively, and these liquids were supplied to the double pipe microreactor 100 to obtain a slurry containing a spherical titanium oxide gel. At this time, the flow rate $Q_1$ of the first liquid L1 was 0.14 mL/min, the linear velocity $u_1$ of the first liquid L1 at the time of contact between the first liquid L1 and the second liquid L2 was 0.11 m/s, and the Reynolds number $Re_1$ of the first liquid L1 until the time when the first liquid L1 and the second liquid L2 came into contact with each other was 42. The flow rate $Q_2$ of the second liquid L2 was 10.4 mL/min, the linear velocity 112 of the second liquid L2 at the time of contact between the first liquid L1 and the second liquid L2 was 0.07 m/s, and the Reynolds number $Re_2$ of the second liquid L2 until the time when the first liquid L1 and the second liquid L2 came into contact with each other was 220. The temperature (reaction temperature) of the first liquid L1 and the second liquid L2 was 25° C. The duration of contact (duration of reaction) between the first liquid L1 and the second liquid L2 at a liquid contact portion was 3 seconds.

The obtained slurry was filtered using a metal mesh, and the spherical titanium oxide gel remaining on the metal mesh was washed with ethanol, and subsequently dried and baked to obtain a solid spherical titanium oxide.

TABLE 9

| | | Comparative Example 3 |
|---|---|---|
| | Comparative Example | |
| First Liquid | Solvent | Hexane |
| | Inorganic Oxide Precursor | Ti(OBu)$_4$ |
| | Inorganic Oxide Precursor Content $c_1$ (% by mass) | 20 |
| | Flow Rate $Q_1$ (mL/min) | 0.14 |
| | Linear Velocity $u_1$ (m/s) | 0.11 |
| | Reynolds Number $Re_1$ | 42 |
| Second Liquid | Solvent | Methanol |
| | Inorganic-oxide-forming Substance | Water |
| | Inorganic-oxide-forming Substance Content $c_2$ (% by mass) | 1.8 |
| | Flow Rate $Q_2$ (mL/min) | 10.4 |
| | Linear Velocity $u_2$ (m/s) | 0.07 |
| | Reynolds Number $Re_2$ | 220 |
| Interfacial Tension of First Liquid to Second Liquid (mN/m) | | — |
| $m_2/m_1$ (Molar Movement Rate Ratio) | | 147 |
| $u_1/u_2$ | | 1.6 |
| $Re_1/Re_2$ | | 0.19 |
| Reactor | | Double Pipe Microreactor FIGS. 11A to 11E |
| Reaction Temperature (° C.) | | 25 |
| Contact Duration (Reaction Duration) (s) | | 3 |
| Metal Oxide Form | | Spherical Form |

INDUSTRIAL APPLICABILITY

The present invention is useful in the technical field of methods for producing an inorganic oxide in the form of a thin film.

The invention claimed is:

1. A method for producing an inorganic oxide in a form of a thin film, the method comprising
    bringing a first liquid and a second liquid into contact with each other, the first liquid containing an inorganic oxide precursor and the second liquid containing a substance reacting with the inorganic oxide precursor of the first liquid to form an inorganic oxide, derived from the inorganic oxide precursor, in the form of a thin film, wherein
    the inorganic oxide in the form of the thin film has a ratio of an average longitudinal diameter to an average thickness is 5 or more and 2000 or less, and
    the bringing of the first liquid into contact with the second liquid is performed by continuous operation, and at least one of the first liquid and the second liquid includes an ionic liquid.

2. The method of claim 1, wherein the inorganic oxide in the form of the thin film has an average thickness of 0.01 μm or larger and 1.5 μm or smaller.

3. The method of claim 1, wherein the inorganic oxide in the form of the thin film includes a titanium oxide in a form of a thin film.

4. The method of claim 1, wherein the first liquid and the second liquid phase-separate from each other.

5. The method of claim 1, wherein the ionic liquid includes an ionic liquid having 1-alkyl-3-methylimidazolium cations.

6. The method of claim 1, wherein the inorganic oxide precursor includes a metal alkoxide.

7. The method of claim 1, wherein the second liquid is a solution in which the substance to form the inorganic oxide is dissolved in the ionic liquid.

8. The method of claim 1, wherein the first liquid is a solution in which the inorganic oxide precursor is dissolved in an organic solvent.

9. The method of claim 1, wherein the first liquid contains one or two or more of toluene, hexane, heptane, benzene, and chloroform.

10. The method of claim 1, wherein an interfacial tension of the first liquid to the second liquid at a temperature of 25° C. at a time of contact between the first liquid and the second liquid is 0.1 mN/m or more and 30 mN/m or less.

11. The method of claim 1, wherein when both of the first liquid and the second liquid flow to contact one another, a ratio of a linear flow velocity of the first liquid to a linear flow velocity of the second liquid at a time of contact between the first liquid and the second liquid is 0.01 or more and 100 or less.

12. The method of claim 1, wherein when both of the first liquid and the second liquid flow to contact one another, a ratio of a Reynolds number of the first liquid to a Reynolds number of the second liquid until a time when the first liquid and the second liquid come into contact with each other is 4 or more and 1000 or less.

13. The method of claim 1, wherein a duration of contact between the first liquid and the second liquid is 0.5 sec or longer and 600 sec or shorter.

14. The method of claim 1, wherein a reaction temperature at a time of contact between the first liquid and the second liquid is 0° C. or higher and 100° C. or lower.

15. The method of claim 1, wherein the inorganic oxide in the form of the thin film has an average longitudinal diameter of 2 μm or larger and 300 μm or smaller.

16. The method of claim 1, wherein the ionic liquid includes ammonium cations.

17. The method of claim 1, wherein the ionic liquid includes 1-methyl-3-methylimidazolium cations, 1-ethyl-3-methylimidazolium cations, 1-propyl-3-methylimidazolium cations, or 1-butyl-3-methylimidazolium cations.

18. The method of claim 1, wherein the inorganic oxide precursor includes a titanium alkoxide or a zirconium alkoxide.

19. The method of claim 18, wherein the titanium alkoxide includes tetraethyl orthotitanate, tetraisopropyl orthotitanate, or tetra-n-butyl orthotitanate.

20. The method of claim 1, wherein a content of the inorganic oxide precursor in the first liquid is 1% by mass or more to 80% by mass or less.

21. The method of claim 1, wherein a content of the substance in the second liquid to form the inorganic oxide is 0.1% by mass or more to 70% by mass or less.

22. A method for producing an inorganic oxide in a form of a thin film, the method comprising
    bringing a first liquid and a second liquid into contact with each other, the first liquid containing an inorganic oxide precursor and the second liquid containing a substance reacting with the inorganic oxide precursor of the first liquid to form an inorganic oxide, derived from the inorganic oxide precursor, in the form of a thin film, the bringing of the first liquid into contact with the second liquid is performed by continuous operation, and at least one of the first liquid and the second liquid includes an ionic liquid, and wherein an interfacial tension of the first liquid to the second liquid at a temperature of 25° C. at a time of contact between the first liquid and the second liquid is 0.1 mN/m or more and 30 mN/m or less.

23. A method for producing an inorganic oxide in a form of a thin film, the method comprising bringing a first liquid and a second liquid into contact with each other, the first liquid containing an inorganic oxide precursor and the second liquid containing a substance reacting with the inorganic oxide precursor of the first liquid to form an inorganic oxide, derived from the inorganic oxide precursor, in the form of a thin film, the bringing of the first liquid into contact with the second liquid is performed by continuous operation, and at least one of the first liquid and the second liquid includes an ionic liquid, and wherein when both of the first liquid and the second liquid flow to contact one another, a ratio of a linear flow velocity of the first liquid to a linear flow velocity of the second liquid at a time of contact between the first liquid and the second liquid is 0.01 or more and 100 or less.

24. A method for producing an inorganic oxide in a form of a thin film, the method comprising bringing a first liquid and a second liquid into contact with each other, the first liquid containing an inorganic oxide precursor and the second liquid containing a substance reacting with the inorganic oxide precursor of the first liquid to form an inorganic oxide, derived from the inorganic oxide precursor, in the form of a thin film, the bringing of the first liquid into contact with the second liquid is performed by continuous operation, and at least one of the first liquid and the second liquid includes an ionic liquid, and wherein when both of the first liquid and the second liquid flow to contact one another, a ratio of a Reynolds number of the first liquid to a Reynolds number of the second liquid until a time when the first liquid and the second liquid come into contact with each other is 4 or more and 1000 or less.

25. A method for producing an inorganic oxide in a form of a thin film, the method comprising bringing a first liquid and a second liquid into contact with each other, the first liquid containing an inorganic oxide precursor and the second liquid containing a substance reacting with the inorganic oxide precursor of the first liquid to form an inorganic oxide, derived from the inorganic oxide precursor, in the form of a thin film, the bringing of the first liquid into contact with the second liquid is performed by continuous operation, and at least one of the first liquid and the second liquid includes an ionic liquid, and wherein the inorganic oxide in the form of the thin film has an average longitudinal diameter of 2 µm or larger and 300 µm or smaller.

* * * * *